A. H. WELLENSIEK.
EXCAVATING MACHINE.
APPLICATION FILED DEC. 26, 1917.
1,387,875.
Patented Aug. 16, 1921.
14 SHEETS—SHEET 2.
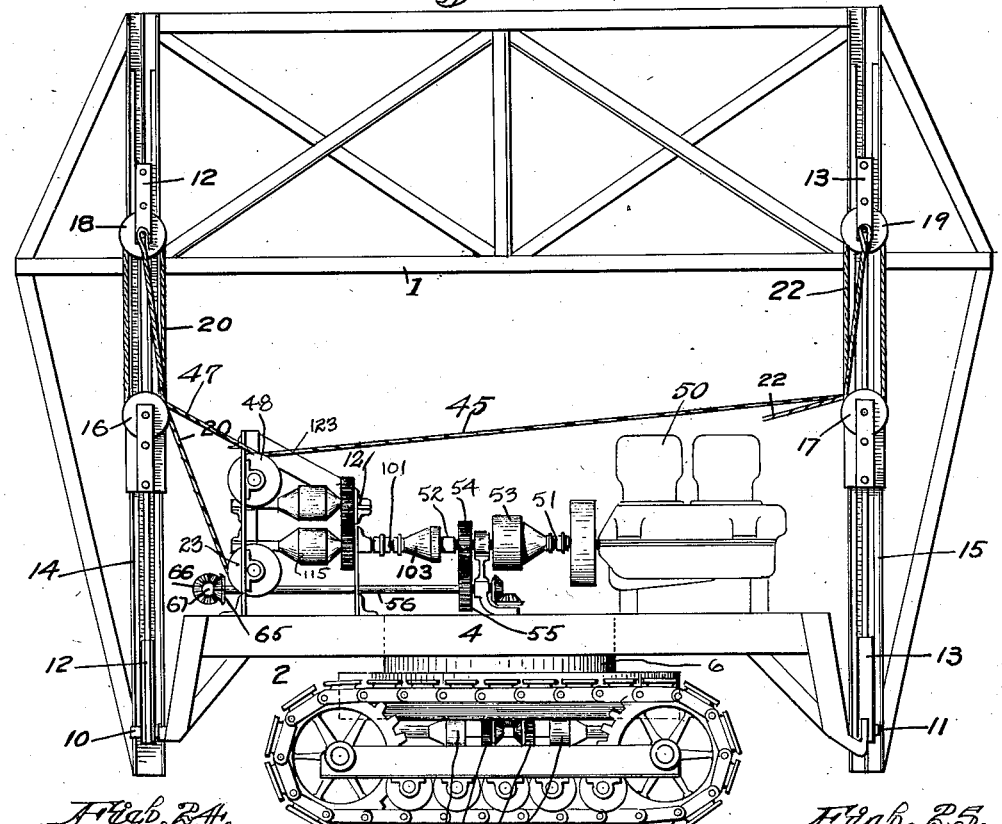
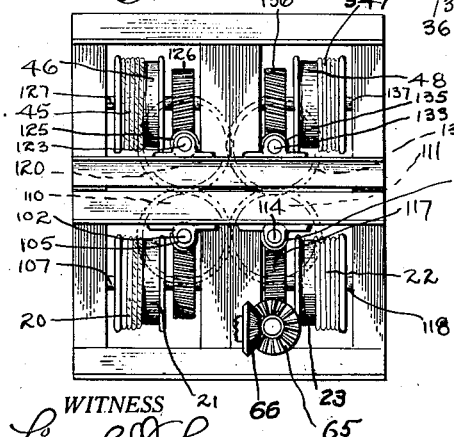
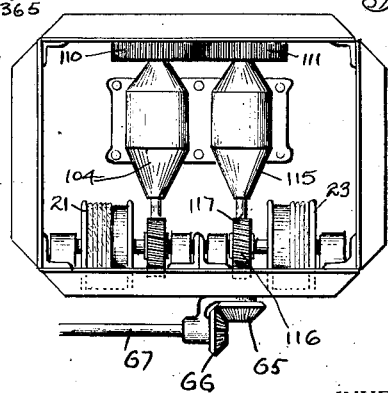
WITNESS
Lincoln Johnson
INVENTOR.
Adolph H. Wellensiek.
BY
Baldwin Vale
ATTORNEY

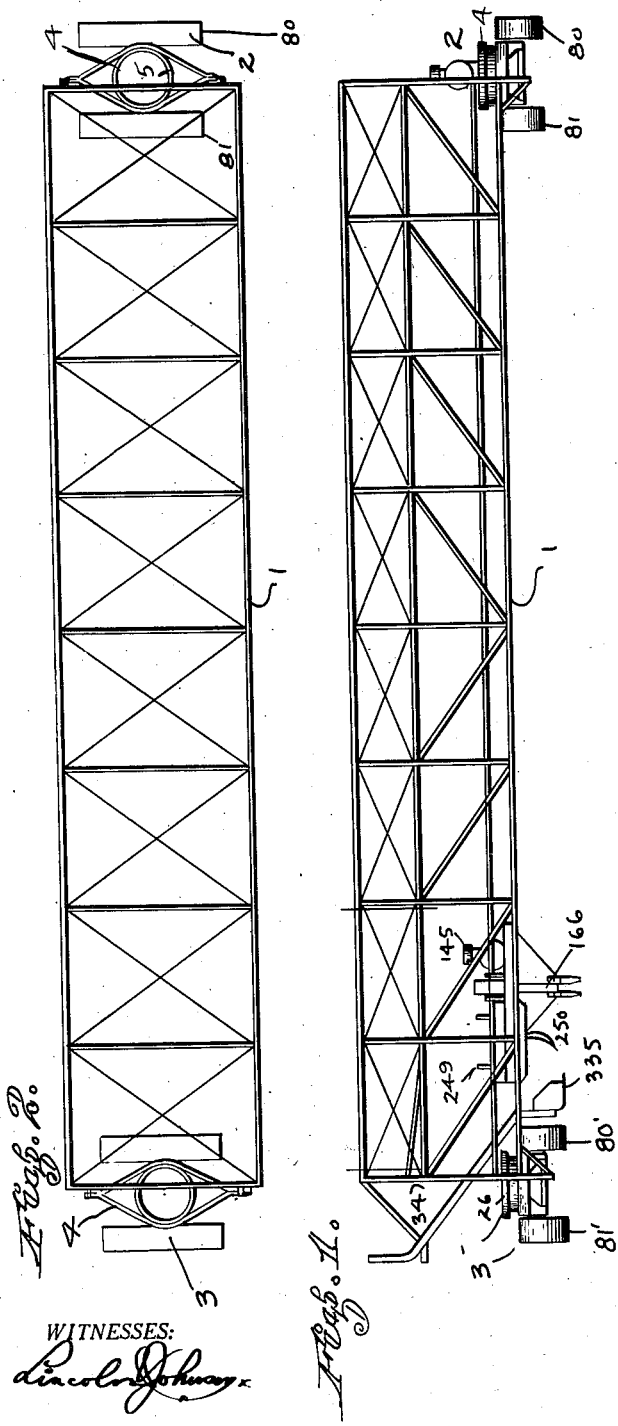

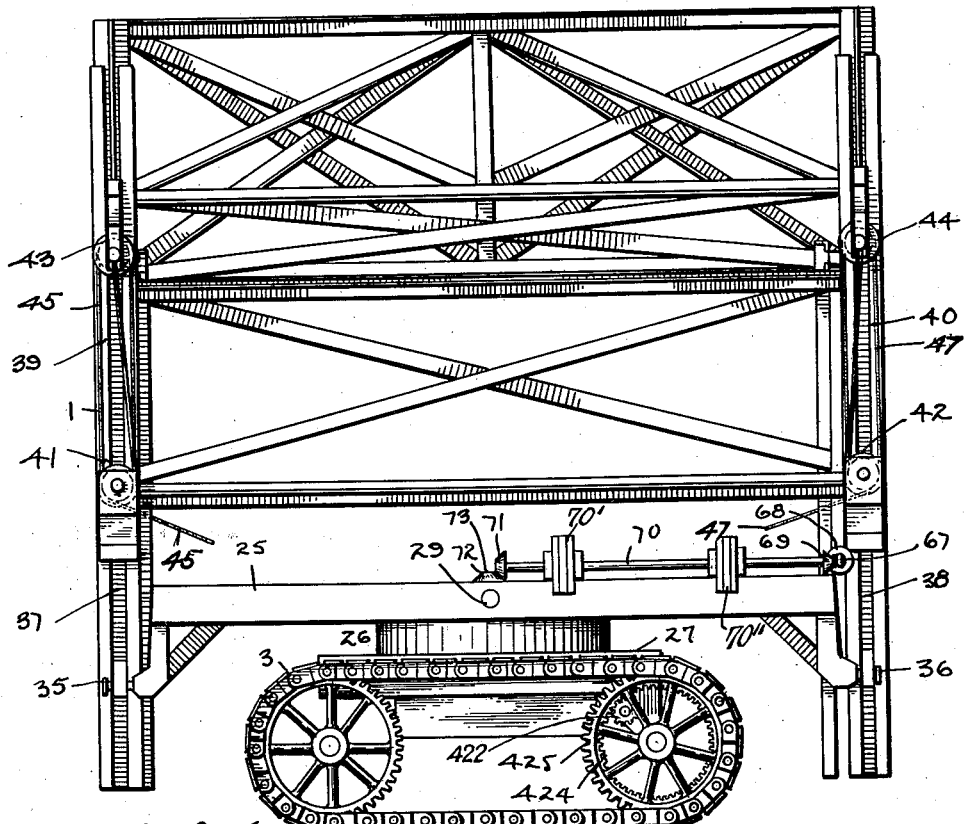

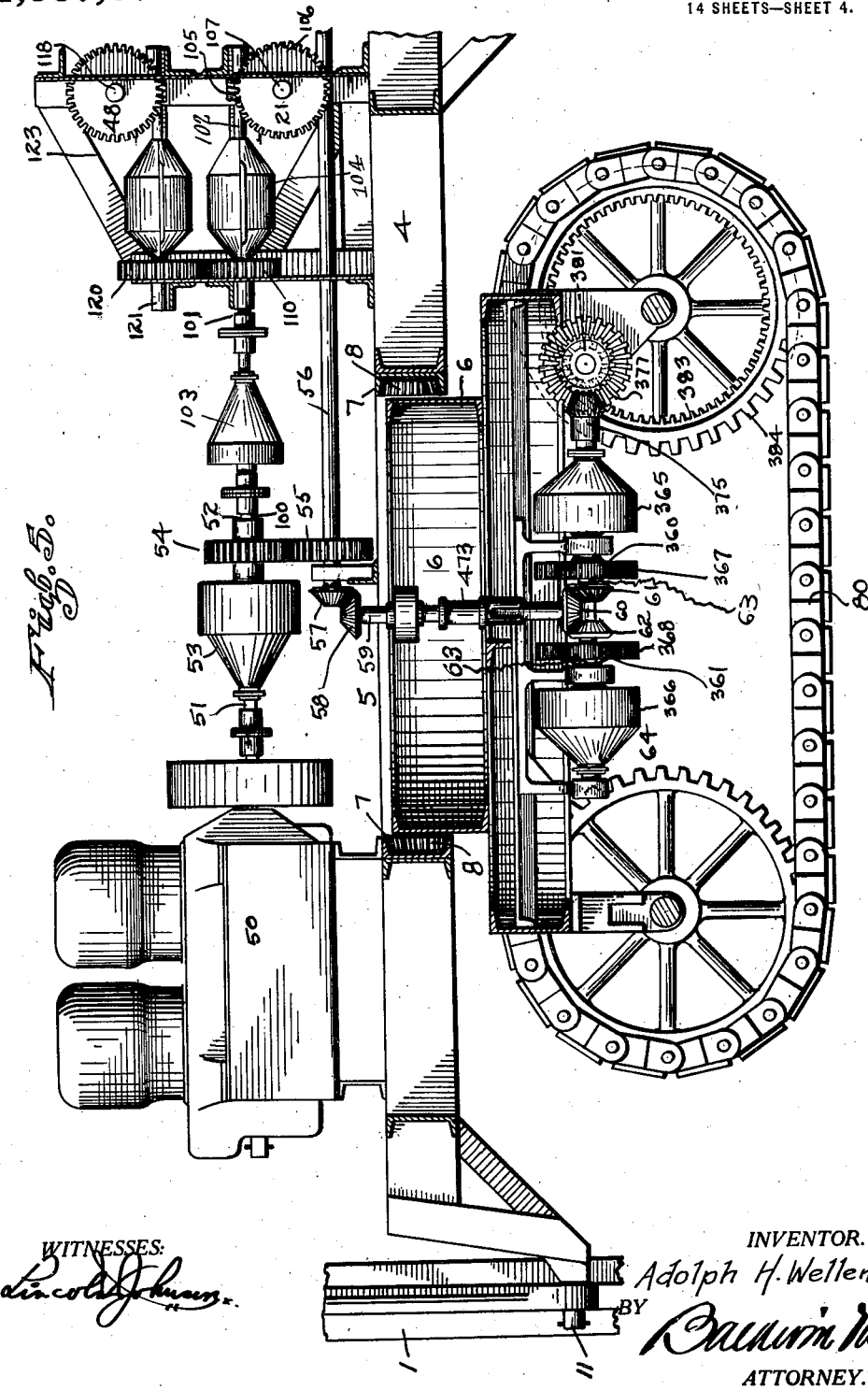

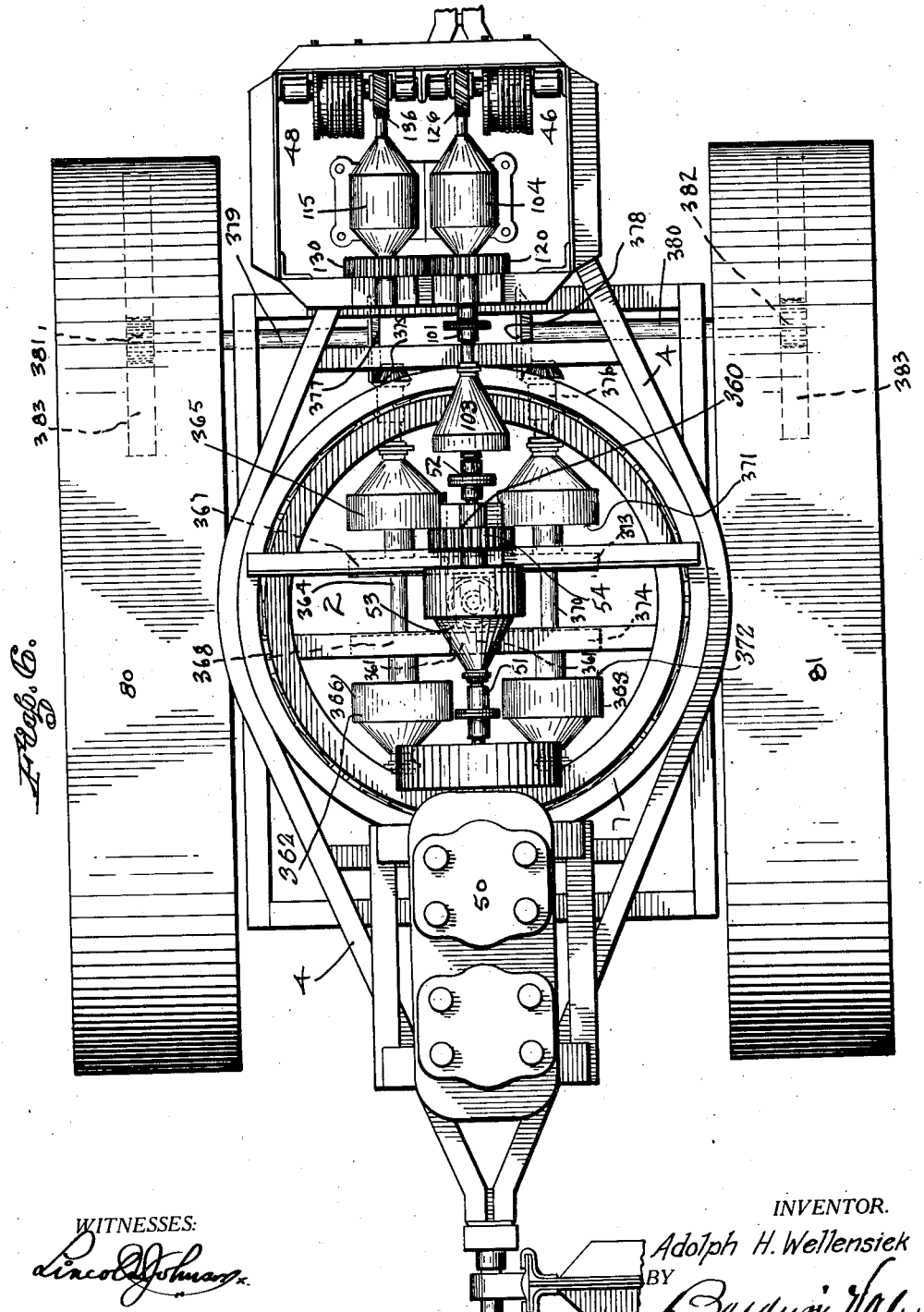

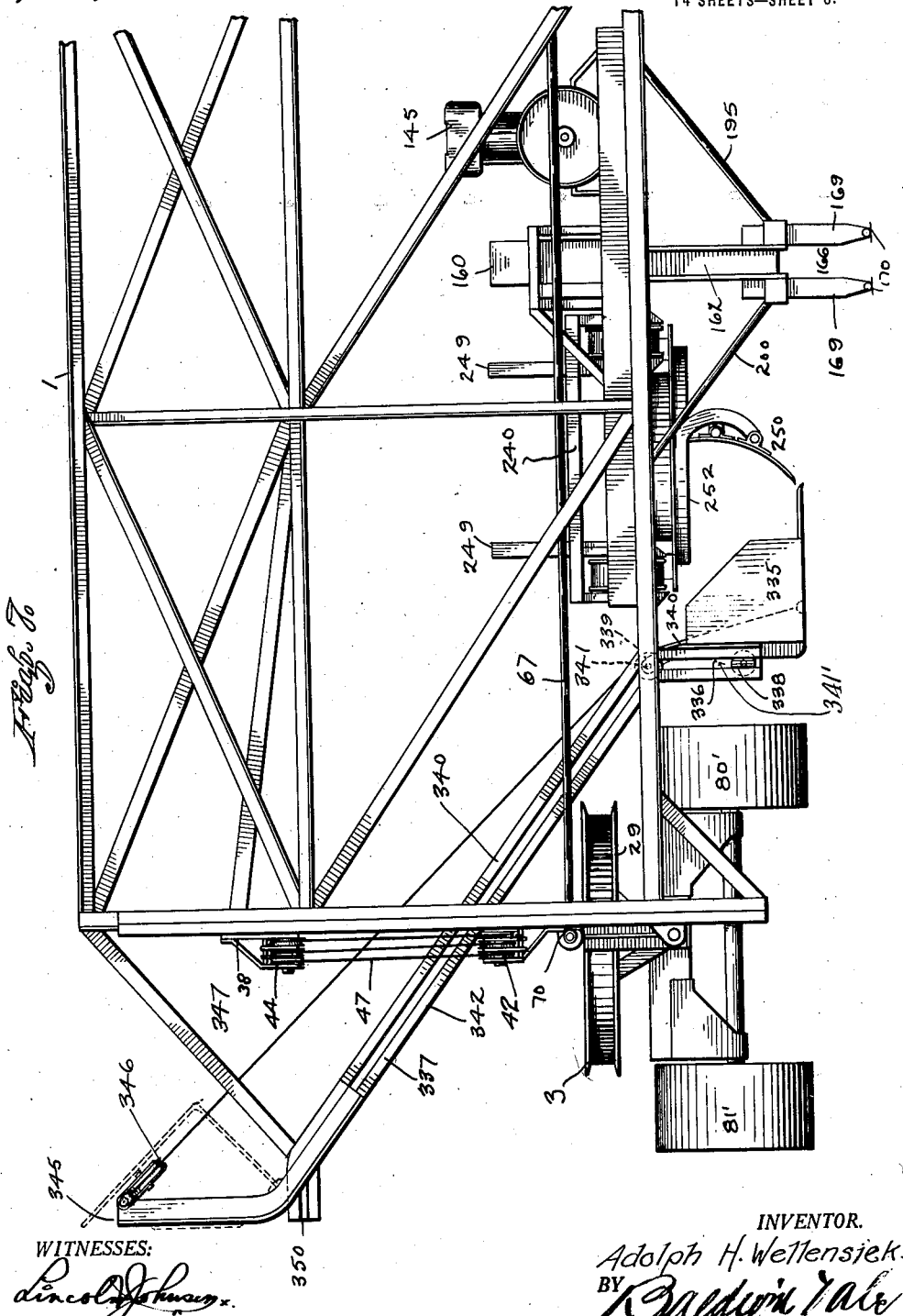

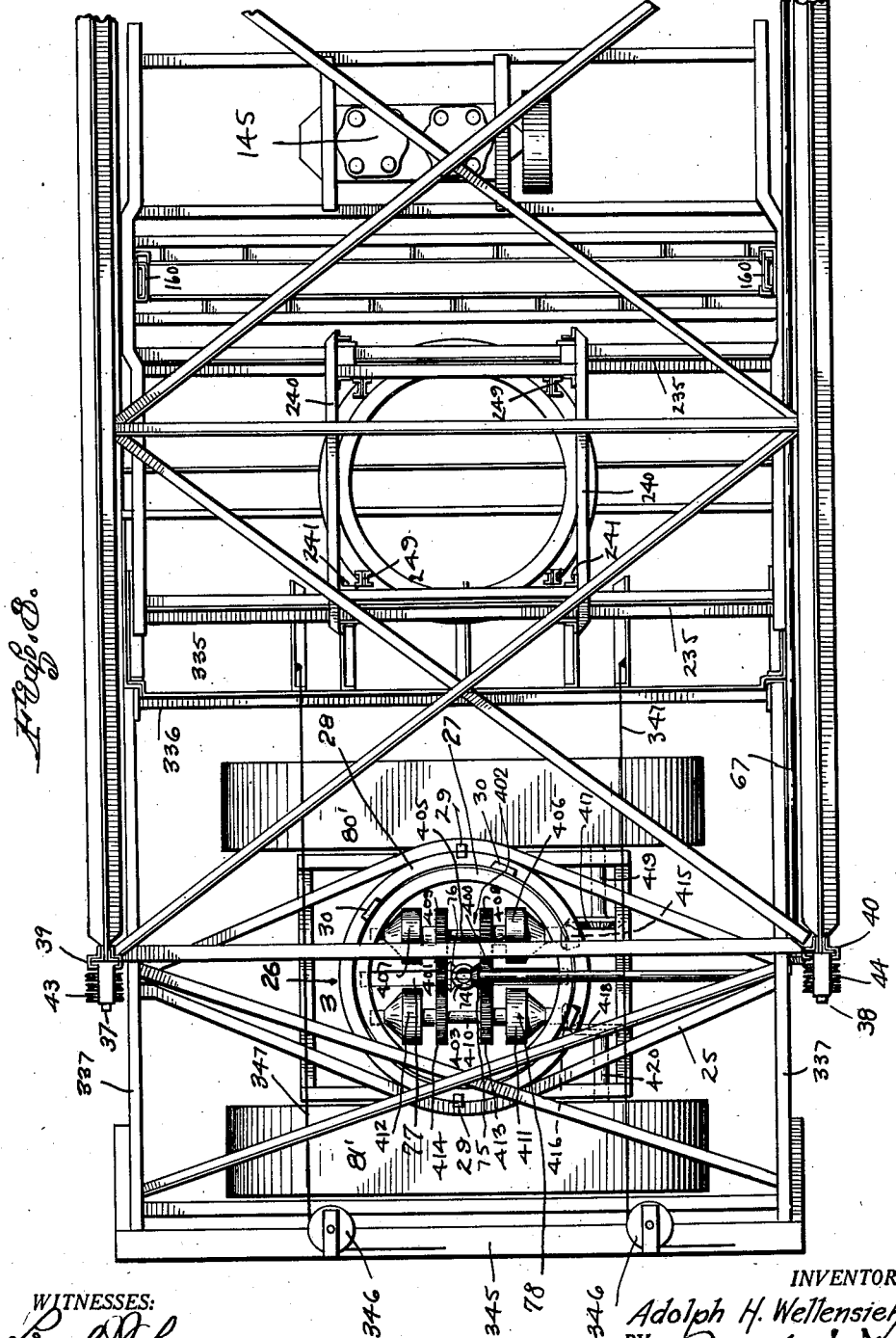

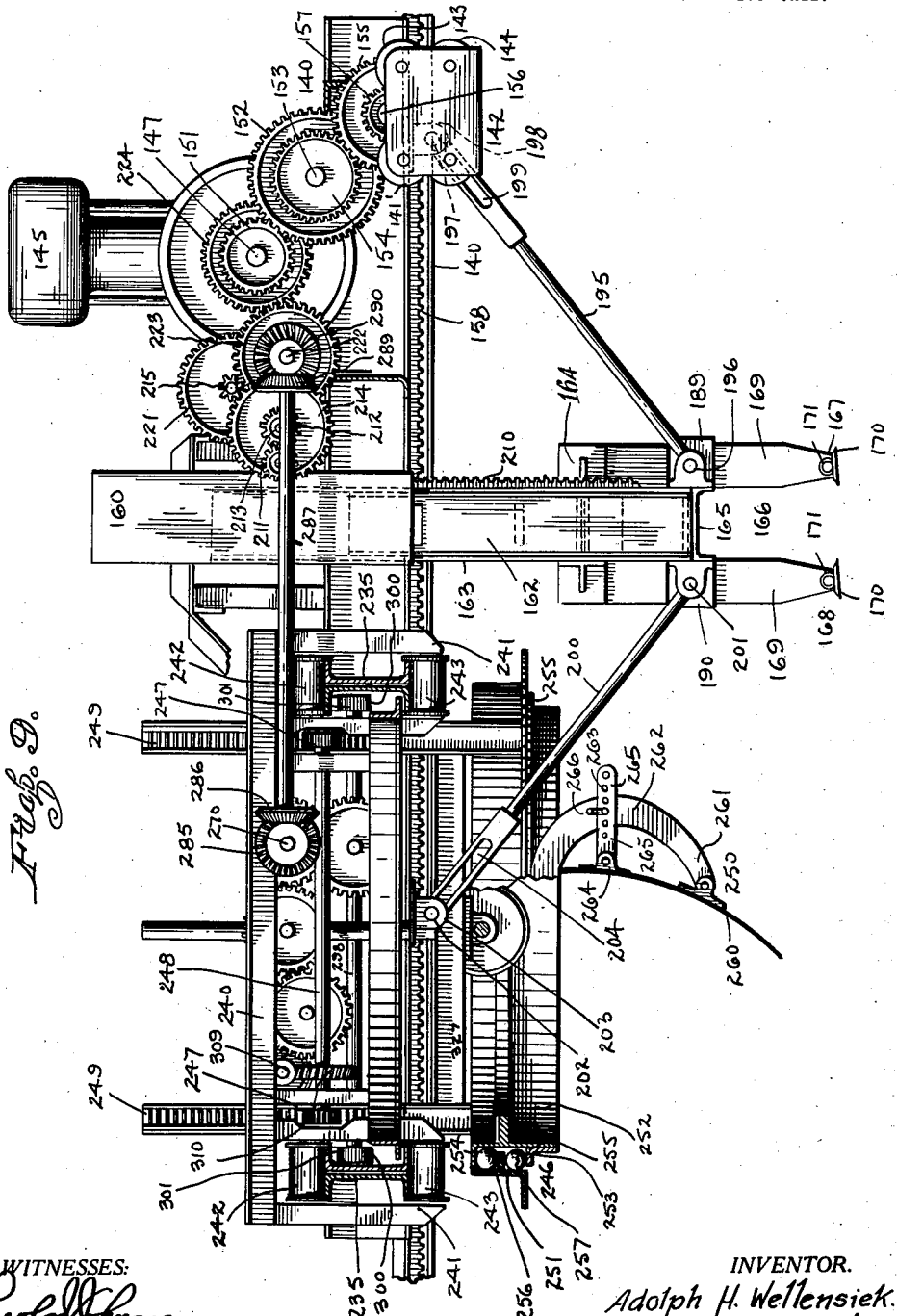

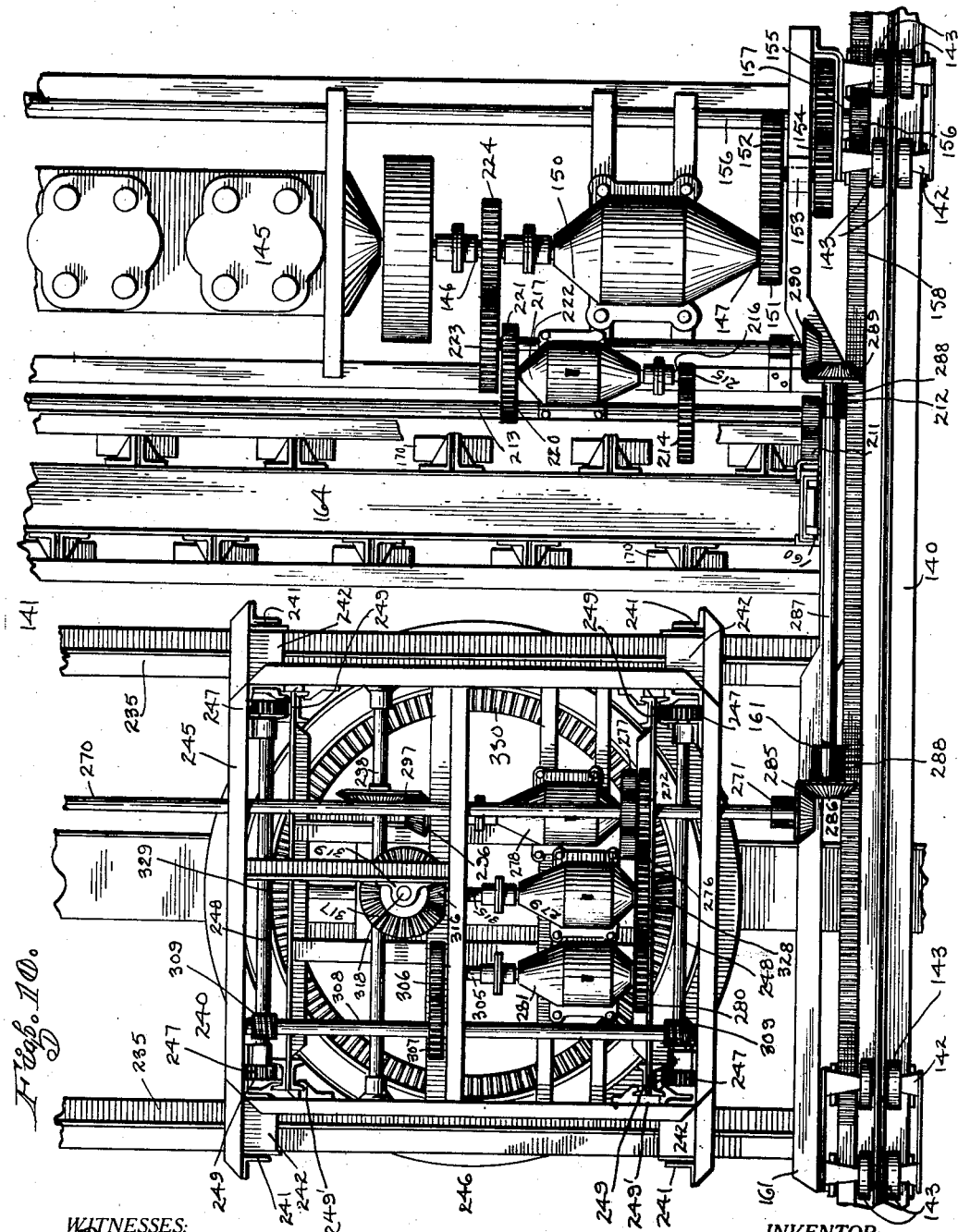

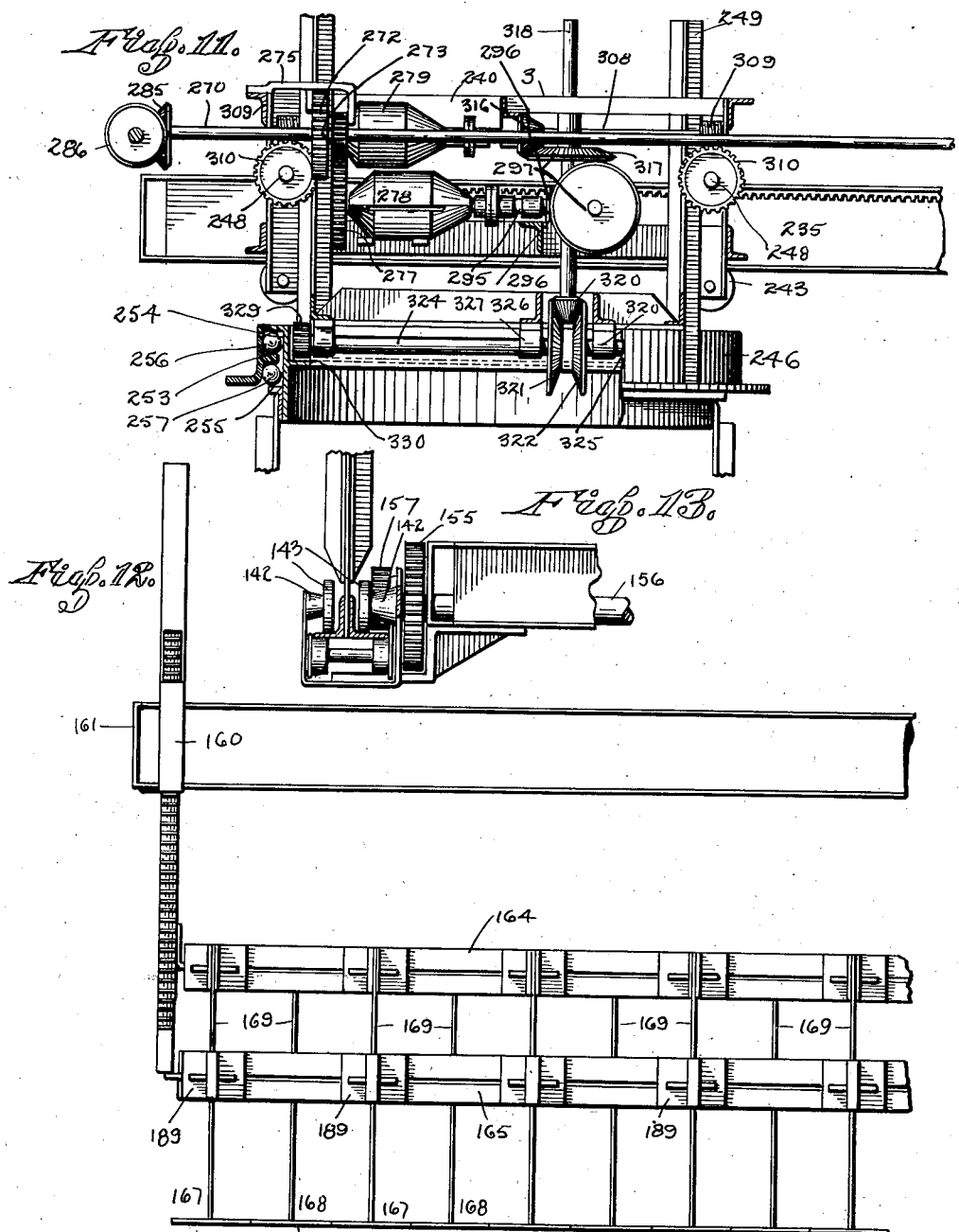

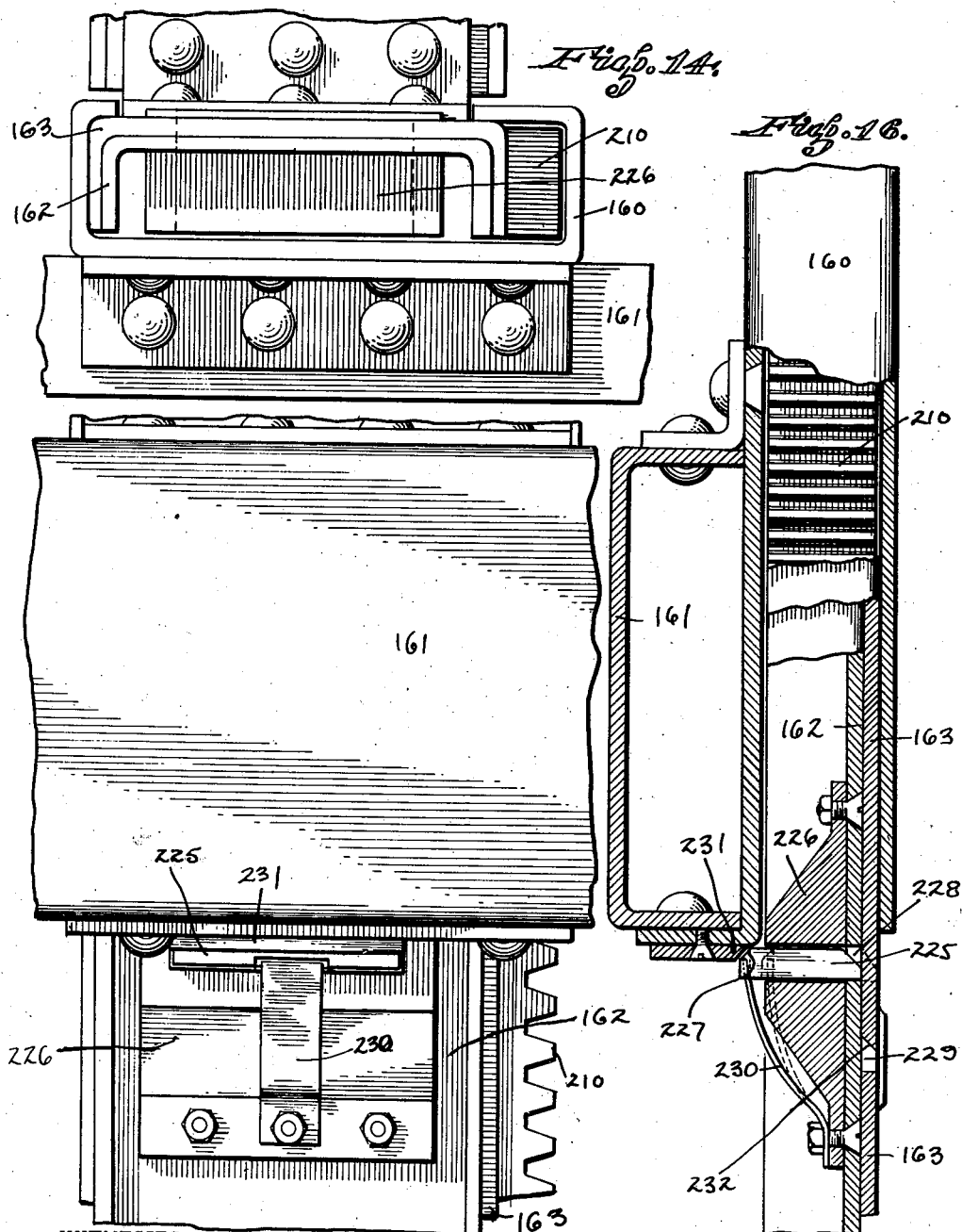

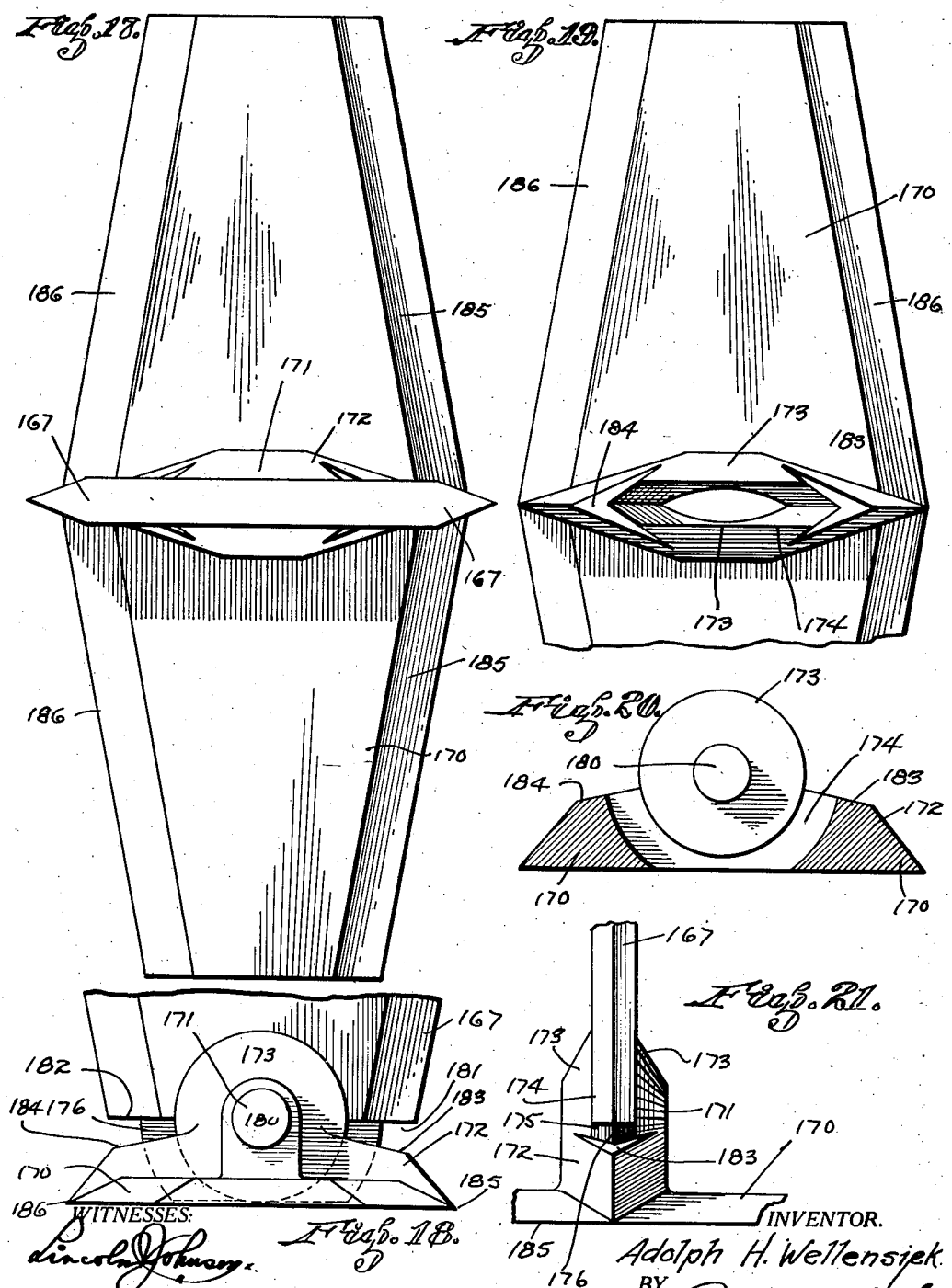

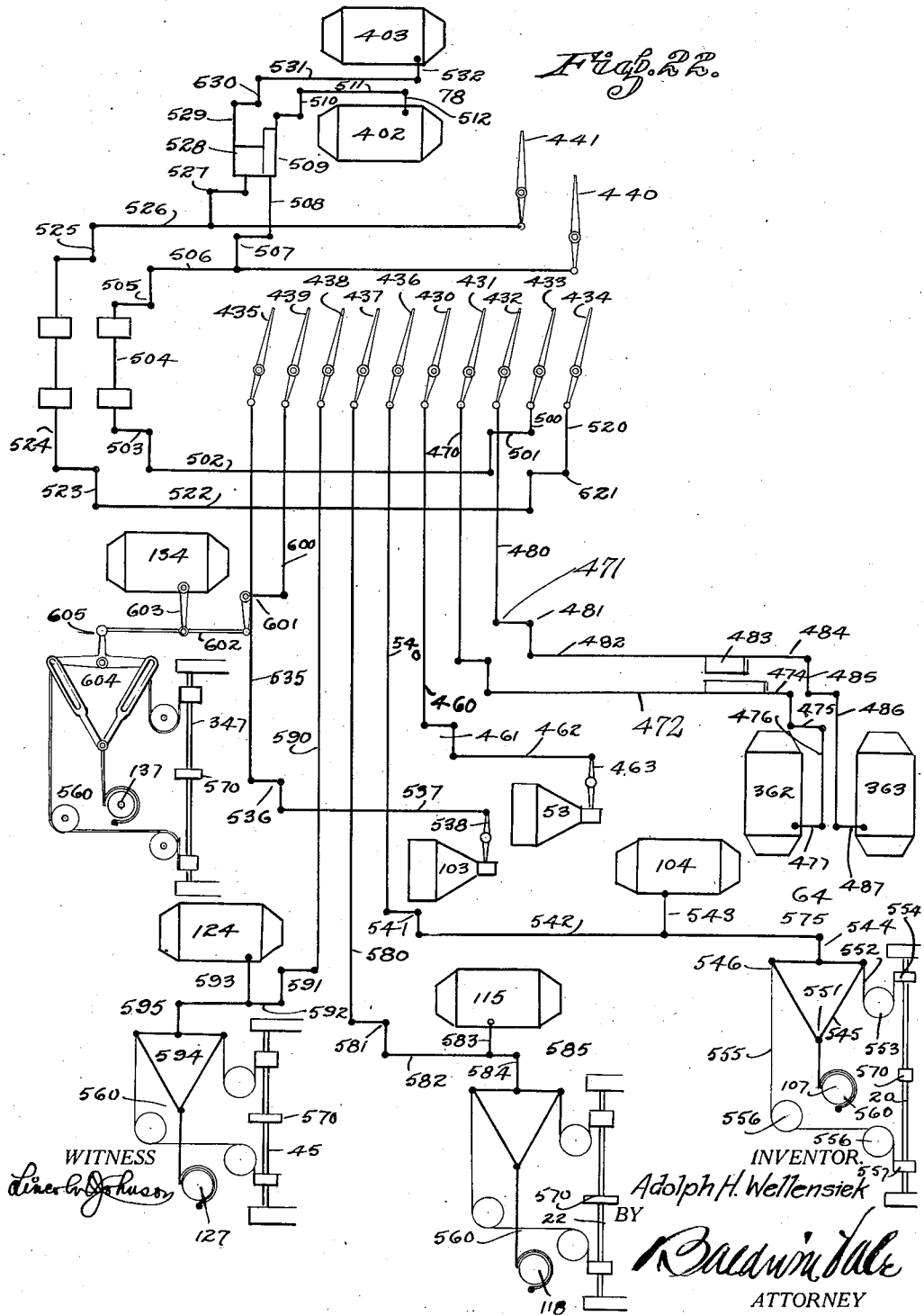

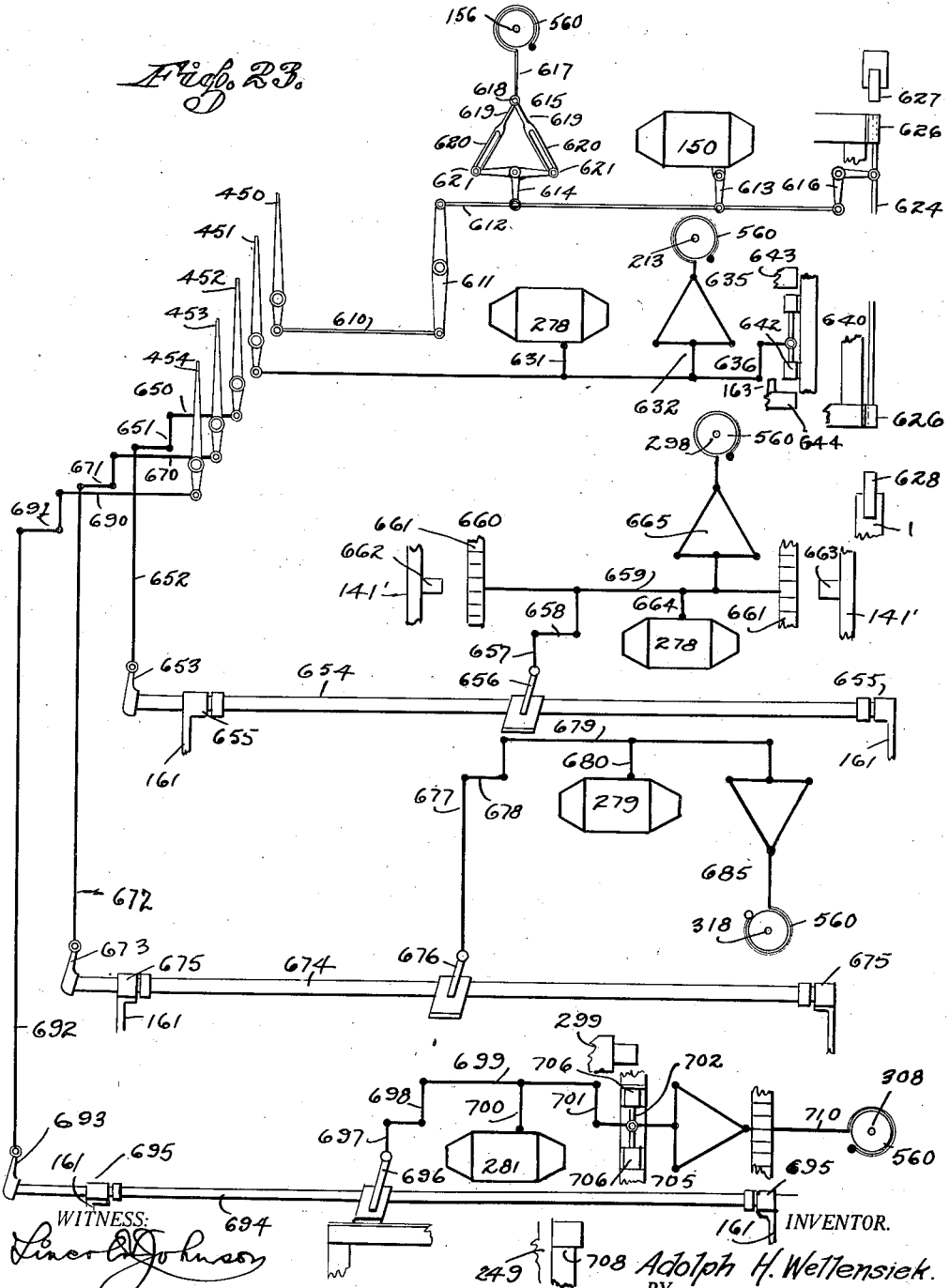

UNITED STATES PATENT OFFICE.

ADOLPH H. WELLENSIEK, OF STOCKTON, CALIFORNIA.

EXCAVATING-MACHINE.

1,387,875.   Specification of Letters Patent.   Patented Aug. 16, 1921.

Application filed December 26, 1917. Serial No. 208,726.

*To all whom it may concern:*

Be it known that I, ADOLPH H. WELLENSIEK, a citizen of the United States, and a resident of the city of Stockton, county of San Joaquin, and State of California, have made certain new and useful Improvements in Excavating-Machines; and I do hereby declare the following to be a full, clear, concise, and exact description of the same.

My invention is an improved excavating machine for general excavating, including ordinary grading, grading land for irrigation, building irrigation check levees, building roads, deep plowing, digging ditches and other excavating work.

The machine is designed for a wide range of speeds and adjustments. A system of control mechanism is employed, which permits fast and accurate work of the machine. The control apparatus for each drive is independent of any other drive as far as practicable. Each part is operated at a normal speed depending on its requirements for efficiency. In the design of the machine, a large factor of safety has been used. The machine may be built of relatively light materials in a great many places and operated with safety. Ample power is determined in the two power plants on the machine to pull the maximum loads, allowing for friction losses in the various gears, bearings and so forth.

In this specification and the annexed drawings, I disclose my invention in the form which I consider the best, but I do not limit my invention to such form as it may be embodied in other forms, and it is to be understood that in and by the claims following the description herein, I intend to cover my invention in whatever form it may be embodied.

Referring to the drawings:

Figure 1 is a front elevation of my excavating machine.

Fig. 2 is a plan view of the machine.

Fig. 3 is an elevation of one side of the machine.

Fig. 4 is an elevation of the other side of the machine.

Fig. 5 is an enlarged longitudinal sectional view of one of the tractor trucks of the machine.

Fig. 6 is a plan view of said tractor truck.

Fig. 7 is an enlarged view in front elevation of a portion of the machine extending from the left side thereof.

Fig. 8 is an enlarged plan of a portion of the machine extending from the left side of the machine as in Fig. 5.

Fig. 9 is an enlarged view partly in elevation and partly in section of the plow and scraper mechanism of the machine.

Fig. 10 is a fragmentary plan view of said plow and scraper mechanism.

Fig. 11 is a view partly in elevation and partly in section of the scraper carrier and operating mechanism.

Fig. 12 is a front elevation of the plow and a portion of the plow elevating and lowering mechanism.

Fig. 13 is a fragmentary end view of the plow and scraper carriage illustrating one of the carriage trucks and the track on which it runs.

Fig. 14 is an enlarged plan view of a portion of the plow lifting mechanism.

Fig. 15 is an enlarged front view of a portion of the plow lifting mechanism.

Fig. 16 is an enlarged vertical sectional view of a portion of the plow lifting mechanism, taken on the line 15 of Fig. 14.

Fig. 17 is an enlarged plan of one of the plows of the machine.

Fig. 18 is an enlarged side view of the lower portion of one of the plows.

Fig. 19 is a plan view of a portion of one of the plow blades.

Fig. 20 is a cross sectional view of one of the plow blades taken on line 19 of Fig. 18.

Fig. 21 is a fragmentary front view of the lower portion of one of the plows.

Fig. 22 is a diagrammatic view of the tractor, frame hoist and shovel hoist controlling means.

Fig. 23 is a diagrammatic view of the controlling means for the plow and scraper carriage and the plow and scraper operating mechanism.

Fig. 24 is an end view of the frame and shovel hoist mechanism.

Fig. 25 is a horizontal section of said mechanism taken on line 25—25 of Fig. 24.

In the drawings, 1 indicates a frame, forming the main frame of the machine, the ends of which are mounted on a pair of power tractor trucks 2 and 3 respectively. The main frame is preferably constructed on the order of a through span bridge but may be otherwise constructed, if desirable. A frame 4 is mounted on the tractor truck 2, to turn horizontally and is fixed against tipping, by means of a turntable 5. The turntable 5 comprises an annular angle iron ring 6 secured on said tractor truck, an annular angle iron track 7 secured on the frame 4 and surrounding the ring 6 and rollers 8 journaled on the ring 6 and mounted to travel on the ring track 7. The ends of the frame 4 are respectively connected by pins 10 and 11 to the lower ends of members 12 and 13, which are mounted respectively in guide ways 14 and 15 on two corners of the main frame 1 at one side of said frame. Sheaves 16 and 17 are slidably mounted in guide ways 14 on the main frame 1 and sheaves 18 and 19 are respectively journaled on the upper ends of the members 12 and 13. A cable 20 passes over the sheaves 16 and 18 and is connected at one end to the frame 1 while its other end is wound on a hoist drum 21 mounted on the frame 4, said cable being adapted to raise and lower and to sustain one corner of the main frame at the desired elevation with relation to the tractor 2 and the ground. A cable 22 passes over the sheaves 17 and 19 and is connected to an end of the main frame 1, while its other end is wound on a hoist drum 23 mounted on the frame 4, said cable being adapted to raise and lower and to sustain the other corner of the main frame at the desired elevation with relation to the tractor 2 and the ground.

A frame 25 is mounted to turn horizontally and to swing vertically on the tractor truck 3 by means of a turntable 26; said turntable comprising an annular angle iron ring 27 secured on the tractor truck, and annular angle iron track 28 to which the frame 26 is pivoted by pivots 29 and rollers 30 journaled on the ring 27 and resting on the track 28.

The ends of the frame 25 are respectively connected by pins 35 and 36 to the lower ends of slides 37 and 38, which slides are mounted respectively to slide vertically in guide ways, 39 and 40 on two corners of the main frame 1 at one side of the frame. Sheaves 41 and 42 are journaled on the main frame 1 and sheaves 43 and 44 are respectively journaled on the upper ends of the slides 37 and 38. A cable 45 passes over the sheaves 41 and 43 and is connected at one end to the frame 1, while its other end is wound around a hoist drum 46 mounted on the frame 25. A cable 47 passes over the sheaves 42 and 44 and is connected at one end to the main frame, while its other end is wound on the hoist drum 48. By means of said cables 45 and 47, the end of the frame above the tractor 3 is raised, lowered and sustained at the desired elevation with relation to the tractor 3 and the ground.

An engine 50 for driving the machine is mounted on the frame 4. The engine shaft 51 drives a sectional drive shaft 52 through a main clutch 53, said sectional shaft being suitably journaled on the frame 4. A gear 54 is secured on the drive shaft 52 and meshes with a gear 55 secured on a shaft 56 suitably journaled on the frame 4. A beveled gear 57 is secured on one end of the shaft 56 and meshes with a beveled gear 58 on the upper end of a vertical shaft 59 suitably journaled on the tractor 2 coaxially with the axis of the turntable 5. On the lower end of the shaft 59 is secured a beveled gear 60 which meshes with beveled gears 61 and 62 loosely mounted on shafts 63 fixed on the frame of the tractor truck 2 said beveled gears being included in a double transmission gearing 64 mounted on the tractor truck. A beveled gear 65 is secured on the rear end of the shaft 56 which meshes with a beveled gear 66 secured on one end of a shaft 67, extending from the frame 4 to the frame 25 and suitably journaled on said frames; the main frame 1 being constructed in such manner as to allow it to be elevated and lowered with relation to the frames 4 and 25, without engaging said shaft 67. A beveled gear 68 is secured on the other end of the shaft 67 and meshes with a beveled gear 69 on the rear end of a shaft 70 journaled on the frame 25. A beveled gear 71 is secured on the forward end of the shaft 70 and meshes with a beveled gear 72 secured on the upper end of a vertical shaft 73 suitably journaled on the tractor truck 3 coaxially with the turntable 26. The shaft 70 has the two universal joints 70'—70'' interposed between the gears 71 and 69 to allow for oscillation of the tractor belts 80' and 81'. On the lower end of the shaft 73 is secured a beveled gear 74 which meshes with beveled gears 75 and 76 loosely mounted on a shaft 77, fixed on the frame of tractor truck 3 said beveled gears and shaft forming part of a double transmission gearing 78 on said tractor truck. Both of the tractor trucks 2 and 3 may be of a standard type including a pair of endless link traction belts 80 and 81 and 80' and 81' respectively, and the transmission gearings 64 and 78 for respectively operating said belts through the usual means which will be described hereinafter.

The main frame hoisting mechanism is as follows: The sectional drive shaft 52, driven by the engine 50 through the engine shaft 51 is composed of a plurality of sections 100, 101, and 102, the shaft section 100 being driven by the engine shaft 51 through the clutch 53 and the gear 54 being secured on said section. The shaft section 101 is driven from the shaft section 100 through a clutch 103. The shaft section 102 is driven from the shaft section 101 through a reverse gearing 104. A worm 105 is secured on the shaft section 102 and meshes with a worm gear 106 secured on a drum shaft 107 suitably journaled on the frame 4 on which shaft is secured the drum 21. A gear 110 is secured on the shaft section 101 and meshes with a gear 111 secured on a sectional shaft 112 suitably journaled on the frame 4, said shaft comprising two sections 113 and 114, the gear 111 being secured on the section 113 and the section 114 being driven from the section 113 through a reverse gearing 115. A worm 116 is secured to the rear end of shaft section 114 and meshes with a worm 117 secured on a drum shaft 118 suitably journaled on the frame 4, on which shaft is secured the drum 23. The gear 110 meshes with a gear 120 on a sectional shaft 121 suitably journaled on the frame 4, said shaft comprising two sections 122 and 123, the gear 120 being secured on the section 122 and the section 123 being driven from the section 122 through a reverse gearing 124. A worm 125 is secured on the shaft section 123 and meshes with a worm gear 126 on a drum shaft 127 suitably journaled on the frame 4, the drum 46 being secured on said shaft. The gears 111 and 120 mesh with a gear 130, secured on a sectional shaft 131, suitably journaled on the frame 4, said shaft comprising two sections 132 and 133, the gear 130 being secured on the section 132 and the section 133 being driven from the section 132 through a reverse gearing 134. A worm 135 is secured on the rear end of the shaft section 133 and meshes with a worm gear 136 on a drum shaft 137 suitably journaled on the frame 4, a drum 48 being secured on said shaft.

A track 140 extends transversely of the frame 1 upon which track a plow and scraper carriage 141 is mounted to travel transversely by means of its trucks 142 upon which the carriage frame 141' is mounted, said trucks including upper and lower wheels 143 and 144, which engage and travel the upper and lower track faces, the upper wheels and the track sustaining the carriage on the frame 1 and the lower wheels and the track preventing upward displacement of the carriage from the track (see Figs. 9 and 10).

The carriage 141 and the plow and scraper operating mechanism are operated independently of the tractor trucks 2 and 3 by an engine 145 mounted on the carriage. The shaft 146 of said engine drives a gear shaft 147 through a reverse gearing 150 of well known construction. A gear 151 is secured on the shaft 147 and meshes with a gear 152 on a shaft 153 suitably journaled in the frame of the carriage 141. A gear 154 secured on the shaft 153 meshes with a gear 155 secured on a shaft 156 extending across and journaled in the frame of the carriage 141, where the following mechanism is duplicated: Pinions 157 are secured on the ends of the shaft 156 which mesh with racks 158 extending along the track 140 and secured to the main frame 1. The rotation of the pinions 157 by the engine 145 through the shafts and gears just described causes said pinions to engage the racks 158 and move the carriage along the track 140 from one side of the main frame 1 to the other according to the position of the gears in the reverse gearing 150.

The plow mechanism will now be described. A pair of vertical guides 160 are secured to the two side carriage frame members 161 in which guides are mounted to slide vertically a pair of slides 162 and 163, said slides being also mounted to slide vertically with relation to each other, one upon the other. A horizontal plow supporting beam 164 is secured at its ends to the slide 163. A horizontal plow guide beam 165 is secured at its ends to the slides 162. A plow 166 is mounted on the beams 164 and 165. Said plow comprises a plurality of plow units 167 and 168, each consisting of a vertical plow standard 169 and a horizontal plow blade 170 pivoted by a pivot 171 to the lower end of said standards. The pivot 171 is of unique construction. An embossment 172 extends across the upper face of the blade 170 which embossment is formed with two upstanding side ears 173 and a slot 174 extending from the bottom of the plow blade up between said ears to receive a lower part 175 of the standard 167 which lower part is formed with arcuate tenons 176 and the slot 174 is mortised and shaped at its ends to receive said tenons. A pivot pin 180 extends through the ears 173 and the lower part 175 of the standard and pivots said blade firmly to said standard in operative position. Shoulders 181 and 182 are formed at the lower end of the standards 170 at the right and left edges thereof for engaging upper faces 183 and 184 on the embossment 172 near the right and left ends of said embossment for holding the plow blade 170 at the desired downward inclination toward the left or the right of the plow according to the direction of travel of the plow. The plow blades 170 are formed with right and left cutting edges 185 and 186 which recede from the standards 169 so that the foremost part of said cutting edges is at the standard or the strongest points of the blades. The plow blade edges cut the earth horizontally while the standard edges cut the earth vertically leaving horizontal slabs of earth. The upper ends of the standards 169 of the plow units 167 are secured to the right side of the beam 164 while the upper ends of the standards 169 of the units 168 are secured to the left side of said beam in such position that the units 167 and 168 are placed in staggered relation to each other with the ends of the blades 170 of the units 167 extending to the ends of the blades 170 of the units 168 so that said blades cover continuously the entire transverse dimension of the plow. Guides 189 and 190 are secured to the right and left sides of the beam 165 in which the standards 169 of the plow units 167 and 168 are slidably fitted to slide vertically. Guy rods 195 are pivoted at their lower ends to the respective ends of the bar 165 at the right side of said bar by pivots 196 while the upper ends of said bars are pivoted to the side carriage frame members 161 by pins 197 fitted in blocks 198 secured to said frame members, the upper ends of said rods being provided with longitudinal slots 199 to receive said pins. Guy rods 200 are pivoted at their lower ends to the respective ends of the bar 165 at the left side of said bar by pivots 201, while the upper ends of said bars are pivoted to the side carriage frame members 161 by pins 202 fitted in blocks 203 secured to said frame members, the upper ends of said rods being provided with longitudinal slots 204 to receive said pins. By the engagement of the upper ends of the slots 199 and 204 of the rods 195 and 200 respectively, said rods limit the downward movement of the beam 165 and slides 162 and said rods hold the plow 166 rigid against the resistance of the earth during the operation of the plow. A vertical rack 210 is secured to each slide 163 with which mesh idler pinions 211 mounted on the frame 141' of carriage 141. Said pinions 211 mesh with pinions 212 on a shaft 213 extending transversely of the carriage and suitably journaled on the carriage frame. A gear 214 on the shaft 213 meshes with a pinion 215 on the shaft 216 of a reverse gearing 217. On the reverse gearing 217 is mounted a gear 220 which meshes with a pinion 221 on a shaft 222 suitably journaled on the carriage frame 141'. A gear 223 is secured on the shaft 222 which meshes with a gear 224 on engine shaft 146. A latch 225 is slidably mounted in a bearing 226 on each slide 162 which latch is formed with upper beveled end faces 227 and 228 respectively. The slides 163 are provided with openings 229 to receive one end of the latch 225 to lock the slides 162 and 163 together so that the slide 162 will be carried upwardly by the slide 163 when the latter slide is moved upwardly. A spring 230 secured to the slide 162 engages the latch 225 to force its engaging end into the opening 229 when the slide 163 is elevated to such position that said opening registers with the latch. A beveled face 231 is formed on the lower part of each guide 160 for engaging the latch beveled face 227 for positively forcing the latch into the opening 229 when the slide 163 has been raised so that the opening 229 registers with the latch and the latch under the influence of spring 230 engages slightly the lower edge of said opening. When the slides 162 and 163 are thus locked together by said latch, the slide 162 is lifted by the slide 163 when the latter slide is lifted and then the inner surface of the guide 160 engages the latch and holds it positively in full engagement with the opening 229, thus positively locking the slide 162 in elevated position. The opening 229 has an upper beveled wall 232 which engages the latch beveled face 228 when the slides are lowered to the lowermost position of the slide 162, and forces the latch out of the opening 229 so that the slide 163 may escape the latch and drop to a lower position. The slides 163 and plow units 167 and 168 are raised and lowered by the engine 145 through the medium of gears 224 and 223 pinion 221, gear 220, reverse gearing 217, pinion 215, gear 214 pinions 212 and 211 and rack 210 and the slide 162 and parts carried thereby are raised and lowered by the slide 163 through said mechanism and the operation of the latch 225.

On the plow and scraper carriage 141 is a transverse track 235 upon which track a scraper carriage 240 is mounted to travel transversely of the cariage 141 by means of trucks 241, said trucks including rollers 242 and 243 which respectively travel along the top and bottom flanges of said track the rollers 242 sustaining the scraper carriage on said track and the rollers 243 preventing upward displacement of the cariage from the track. The scraper carriage includes a frame 245 mounted on the trucks 241. A horizontal scraper turntable 246 is mounted on the scraper carriage by means of pinions 247 on shafts 248 suitably journaled on the carriage frame 245 and racks 249 mounted on the carriage frame 245 in vertical guides 249' and meshing with said pinions. A scraper 250 is suspended on the scraper carriage from the turntable 246. The turntable comprises two annular members 251 and 252, the member 252 being arranged within member 251, which member 251 is secured to the lower ends of the racks 249. The member 251 is formed with an internal annular horizontal flange 253. The member 252 is formed with two external superimposed annular flanges 254 and 255 which flanges are arranged respectively above and below the flange 253. Between the flanges 253 and 254 are arranged balls 256, and between the flanges 253 and 255 are arranged balls 257, thus providing ball bearings for the inner turntable member 252 to turn upon on the member 251, the balls 256 and flanges 253 and 254 sustaining the member 252 on the member 251 and the balls 257 and flanges 255 and 253 preventing upward displacement of the member 252 with relation to the member 251. The scraper 250 includes a blade 260 with lower and upper horizontal edges which blade is pivoted in the rear at 261 to the lower end of the arms 262 depending from the turntable member 252. Links 263 are pivoted at 264 to the rear of the blade, which links are provided with holes 265 into which latches 266 on the arms 262 are adapted to spring to hold the blade 260 at the desired inclination. By introducing the latch into different holes, the blade may be adjusted to and held at different inclinations. A shaft 270 is journaled in bearings 271 on the plow and scraper carriage 141 and extends transversely of said carriage and the scraper carriage 240. A gear 272 and a pinion 273 are feathered on shaft 270 and are respectively held by a fork 275 in mesh with drive gears 276 and 277 of reverse gearings 278 and 279 mounted on the frame 245 of the scraper carriage 240. The gear 276 meshes with drive gear 280 of reverse gearing 281. A beveled gear 285 secured on the end of shaft 270 meshes with a beveled gear 286 on one end of a transmission shaft 287 journaled in bearings 288 on the side frame member 161 of the plow and scraper carriage 141. A beveled gear 289 is secured on the other end of the shaft 287 and meshes with a beveled gear 290 on the end of shaft 222. The scraper carriage drive shaft 270 is driven by the engine 145 through the medium of engine shaft 146, gears 224 and 223, shaft 221, beveled gears 290 and 289, shaft 287, and beveled gears 286 and 285. On the end of the shaft 295 of the reverse gearing 278 is secured a beveled gear 296 which meshes with a beveled gear 297 on a shaft 298 suitably journaled in the frame 245 of the scraper carriage. Pinions 300 are secured on the ends of shaft 298 and mesh with racks 301 extending transversely of the plow and scraper carriage 141 along the track 235. The scraper carriage 240 is moved transversely of the plow and scraper carriage 141 by the engine 145 through the scraper carriage drive shaft 270 and its operating means, pinion 273, gear 277, reverse gearing 278, shaft 295, beveled gears 296 and 297, shaft 298, pinions 300 and racks 301. On the shaft 305 of the reverse gearing 281, is secured a gear 306 which meshes with a gear 307 on a shaft 308 suitably journaled on the frame 245 of the scraper carriage. Worms 309 on shaft 308 mesh with worm gears 310 on shafts 248. The scraper 250 is elevated and lowered by the engine 145 through the scraper carriage drive shaft 270 and its operating means, gears 272, 276 and 280; reverse gearing 281; shaft 305; gears 306 and 307; shaft 308; worms 309; worm gears 310; shafts 248; pinions 247; and racks 249. On the shaft 315 is secured a a beveled pinion 316 which meshes with a beveled gear 317 slidably journaled on a vertical shaft 318 held in a bearing 319 on the frame 245 of the scraper carriage 240. On the lower end of said vertical shaft 318 is secured a beveled pinion 320 which meshes with two beveled gears 321 and 322 respectively on the inner ends of shafts 324 and 325 which extend diametrically of the turntable 246, and are journaled in bearings 326 on a frame 327 secured to the racks 249 and rigid with the turntable member 251. On the outer ends of the shafts 324 and 325 are secured pinions 328 and 329 which mesh with an internal gear 330 on the turntable member 252. The scraper is turned on the turntable 246 by the engine 145 through the medium of scraper carriage operating shaft 270 and its operating means, gears 272 and 276, reverse gearing 279, shaft 315, beveled pinion 316, beveled gear 317, shaft 318, beveled pinion 320, beveled gears 321 and 322, shafts 324 and 325, pinions 328 and 329, rack 330 and turntable member 252.

A shovel 335 is mounted by means of truck 336 on tracks 337 secured to the main frame 1 at the left end thereof. The truck 336 includes rear wheels 338 and front wheels 339 which travel along the tracks 337. The shovel extends transversely of the main frame 1. The shovel is pivotally mounted on the truck 336 by arms 340 secured to the forward end of the shovel and pivotally connected to the forward end of the truck 336 at 341. The tracks 337 are formed with a lower vertical portion 341' and upwardly inclined portions 342. The lower portion of the tracks receives the truck rollers 338 and 339 so as to enable the shovel to rest bottom downward and upon the ground to receive the dirt scraped up by the scraper 250. A bracket 345 is secured to the upper end of the tracks 342, to which bracket are secured and connected the sheaves 346, through which extend cables 347, the ends of which, are connected to the bottom of the shovel while the other ends are wound around the drum 48. The upper ends of the tracks 337 have stops 350 thereon to engage the wheels 339 of the shovel truck 336 to arrest the upward travel of the shovel at the upper end of said tracks.

The double transmission gearing 64 of the tractor truck 2 includes two pinions 360 and 361 loosely mounted on shafts 63 and secured respectively to the beveled gears 61 and 62. Said double transmission gearing combines two units 362 and 363. The unit 362 includes a shaft 364 suitably journaled on the frame of the tractor truck 2, clutches 365 and 366, one member of each of said clutches being secured to said shaft and gears 367 and 368 loosely mounted on the shaft 364 and secured respectively to the other member of said clutches. The unit 363 includes a shaft 370 suitably journaled on the tractor truck frame, clutches 371 and 372, one member of said clutches being secured to said shaft and gears 373 and 374 loosely mounted on said shaft and secured respectively to the other member of said clutches. Beveled pinions 375 and 376 are secured on the rear end of shafts 364 and 370 respectively, which mesh with beveled gears 377 and 378 on the inner ends of drive shafts 379 and 380 suitably journaled on the frame of the tractor truck 2. On the outer ends of said shafts 379 and 380 are secured pinions 381 and 382 which mesh with internal gears 383 on the drive sprockets 384 of the traction belts 80 and 81 respectively.

The double transmission gearing 78 of the tractor truck 3 includes two pinions 400 and 401 loosely mounted on the shaft 77 and secured respectively to the beveled gears 75 and 76. Said double transmission gearing combines two units 402 and 403. The unit 402 includes a shaft 405 suitably journaled on the frame of tractor truck 3, clutches 406 and 407, one member of each of which clutches is secured to said shaft 405, and gears 408 and 409 loosely mounted on said shaft and secured respectively to the other member of said clutches. The unit 403 includes a shaft 410 suitably journaled on the frame of the tractor truck 3, clutches 411 and 412, one member of which is secured to the shaft 410 and gears 413 and 414 loosely mounted on the shaft 410 and secured respectively to the other member of said clutches. Beveled pinions 415 and 416 are secured on the rear end of shafts 405 and 410 which respectively mesh with beveled gears 417 and 418 on the inner ends of drive shafts 419 and 420 suitably journaled on the frame of the tractor truck 3. On the outer end of the shafts 419 and 420 are secured pinions 422 which mesh with internal gears 424 on the drive sprockets 425 of the traction belts 80' and 81' respectively of the tractor truck 3.

The control means illustrated in Figs. 22 and 23 will now be described.

A group of hand levers 430 to 441 inclusive are arranged on the machine, the levers 430 to 439 inclusive being arranged on the frame 4 and the levers 440 to 441 being arranged on the frame 25 for controlling the operation of the tractor trucks 2 and 3, the frame hoisting means and the shovel hoisting means.

A group of hand levers 450 to 454 inclusive, are arranged on the frame 4 and near the group of levers 430 to 439 inclusive whereby both groups of levers may be operated from a common station and by one man. The lever 430 is the power controlling lever for controlling the application of power of the engine 50 to the tractor trucks, frame hoisting means and shovel hoisting means. The lever 430 is connected by rod 460 to one arm of bell crank lever 461 pivotally mounted on the frame 4, the other arm of which bell crank lever is connected by rod 462 to one arm of clutch engaging lever 463 pivotally mounted on the frame 4, the other arm of which lever 462 operatively engages the clutch 53. By means of the lever 430 and its connections, the clutch 53 may be operated to clutch the shaft 51 to enable the engine to drive shaft 52 from the engine shaft.

The lever 431 controls the unit 362 of the transmission gearing 64 of the tractor truck 2. The lever 431 is connected by rod 470 to one arm of bell crank lever 471 pivotally mounted on the frame 4, the other end of which bell crank lever is connected by rod 472 to the upper end of a sleeve 473 loosely surrounding the center shaft 59 of the tractor 2. The lower end of the sleeve 473 is connected by rod 474 to one arm of bell crank lever 475 pivotally mounted on the frame of the tractor truck 2, the other arm of which bell crank lever is connected by link 476 to the clutch operating lever 477 of the transmission gearing unit 362. The lever 431 in neutral position, as shown, through its connections, holds the clutches 365 and 366 out of operation and the traction belt 80 is thereby disconnected from its operating mechanism. When the lever 431 is thrown in one direction the clutch 365 through lever 477 and its connections 470 to 476 inclusive, is thrown into operation clutching gear 367 the shaft 364 and the tractor belt 80 is driven forward by the engine 50 through the medium of engine shaft 51 clutch 53, shaft 52, gears 54 and 55, shaft 56, beveled gears 57 and 58, shaft 59, beveled gears 60 and 61, pinions 360, gear 367, clutch 365, shaft 364, beveled pinion and gear 375 and 377, shaft 379, pinion 381, internal gear 383 and drive sprocket 384 of said traction belt. When the lever 431 is thrown in the other direction the clutch 366 is thrown into operation through lever 477, and its connections 470 to 476 inclusive, clutching gear 368 to the shaft 364 and the traction belt 80 is driven backward by the engine through beveled gear 60 and its operating connections with the engine beveled gear 62, pinion 361, gear 368, clutch 366, shaft 364, beveled pinion and gear 375 and 377, shaft 379, pinion 381, internal gear 383 and sprocket 384 of said traction belt. The lever 432 controls the unit 363 of the transmission gearing 64 of the tractor truck 2. The lever 432 is connected by rod 480 to one arm of a bell crank lever 481 pivotally mounted on the frame 4, the other arm of which bell crank lever is connected by rod 482 to the upper end of a sleeve 483 loosely surrounding the sleeve 473 on the shaft 59. The lower end of said sleeve 483 is connected by link 484 to one arm of bell crank lever 485 pivotally mounted on the frame of the tractor truck 2, the other arm of which bell crank lever is connected by link 486 to clutch operating arm 487 of transmission gearing unit 363. The lever 432 in neutral position as shown through its connections holds the clutches 371 and 372 out of operation and the traction belt is thereby disconnected from its operating mechanism. When the lever 432 is thrown in one direction, the clutch 371, through lever 487 and its connections 480 to 486, inclusive, is thrown into operation, clutching gear 373 to the shaft 370 and the traction belt 81 is driven forward by the engine 50 through the medium of engine shaft 51, clutch 53, shaft 52, gears 54 and 55, shaft 56, beveled gears 57 and 58, shaft 59, beveled gears 60, and 61, pinion 360, gear 373, clutch 371, shaft 370, beveled pinion and gear 376 and 378, shaft 380, pinion 382, internal gear 383, and drive sprocket 384 of said traction belt. When the lever 432 is thrown in the other direction, the clutch 372 is thrown into operation through lever 487 and its connections 480 to 486 inclusive, clutching the gear 374 to the shaft 370 and the traction belt 81 is driven backward by the engine through beveled gear 60 and its operating connections with the engine, beveled gear 62, pinion 361, gear 374, clutch 372, shaft 370, beveled pinion and gear 376 and 378, shaft 38, pinion 382, and internal gear 383 and drive sprocket 384 of said traction belt. When both clutches 365 and 371 are thrown into operation, both traction belts are driven forward and the tractor truck 2 travels straight ahead. When both clutches 366 and 372 are thrown into operation both tractor trucks are caused to travel straight backward. Either clutch of either unit of the transmission 64 may be thrown into operation while both clutches of the other unit are out of operation, or any two clutches of the two units may be thrown into operation to drive the truck in either direction or to steer the truck in any direction. With the use of the transmission gearing 64 and its control means the truck 2 may be operated synchronously with or independently of the truck 3 as will appear more clearly hereinafter.

The lever 433 controls the unit 402 of the gearing transmission 78 of tractor truck 3. The lever 433 is connected by link 500 to one arm of a bell crank lever 501, pivoted on frame 4, the other arm of which lever is connected by rod 502 to one arm of bell crank lever 503 pivoted on the frame 1. The other arm of bell crank lever 503 is connected by rod 504 to one arm of bell crank lever 505. The other arm of bell crank lever 505 is connected by rod 506 to one arm of bell crank lever 507. The other arm of bell crank lever 507 is connected by link 508 to the lower end of a sleeve 509 loosely fitting the center shaft 73 of tractor truck 3, the upper end of which sleeve is connected to one arm of bell crank lever 510 pivoted on the frame 25. The other arm of the bell crank lever 510 is connected by link 511 to the operating lever 512 of the unit 402. The lever 433 in neutral position, as shown, through its connections holds the clutches 406 and 407 out of operation and the traction belt 80' is thereby disconnected from its operating mechanism. When the lever 433 is thrown in one direction, the clutch 406, through lever 512 and its connections 500 to 511 inclusive, is thrown into operation, clutching the gear 408 to the shaft 405, and the traction belt 80' is driven forward by the engine 50 through the medium of engine shaft 51, clutch 53, shaft 52, gears 54 and 55, shaft 56, beveled pinions 65 and 66, shaft 67, beveled gears 68 and 69 shaft 70, beveled gears 71 and 72, shaft 73, bevelea gears 74 and 75, pinion 400, gear 408, clutch 406, shaft 405, beveled gears 415 and 417, shaft 419, pinion 421, and internal gear 424 and drive sprockets 425 of said belt. When the lever 433 is thrown in the other direction, the clutch 407 through lever 512 and its connections, is thrown into operation, clutching the gear 409 to the shaft 405, and the traction belt 80' is driven backward by the engine 50 through beveled gear 74 and its operating means, beveled gear 76, pinion 401, gear 409, clutch 407, shaft 405, beveled gears 415 and 417, shaft 419, pinion 421, and internal gear 424 and sprocket 425 of said traction belt.

The lever 434 controls the unit 403 of the transmission gearing 78 of tractor 3. The lever 434 is connected by rod 520 to one arm of bell crank lever 521 pivoted on frame 4, the other arm of which lever is connected by rod 522 to one arm of bell crank lever 523 pivoted on frame 1. The other arm of bell crank lever 523 is connected by rod 524 to one arm of bell crank lever 525. The other arm of bell crank lever 525 is connected by rod 526 to one arm of bell crank lever 527. The other arm of bell crank lever 527 is connected to the lower end of a sleeve 528 which fits loosely around the sleeve 509 on shaft 73 the upper end of which sleeve is connected by link 529 to one arm of bell crank lever 530. The other arm of bell crank lever 530 is connected by rod 511 to the operating lever 532 of the unit 403 of the transmission 78 of truck 3. The lever 434 in neutral position as shown, through its connections, holds the clutches 411 and 412 out of operation and the tractor belt 81' is thereby disconnected from its operating means. When the lever 434 is thrown in one direction, the clutch 411, through lever 532 and its connections 520 to 531, inclusive, is thrown into operation, clutching the gear 413 to shaft 410 and the traction belt 81' is driven forward by the engine 50 through beveled gear 74 and its operating means, beveled gear 75, pinion 400, gear 413, clutch 411, shaft 410, beveled gears 416 and 418, shaft 420, pinion 422 and internal gear 424 and drive sprocket 425 of said traction belt. When the lever 434 is thrown in the other direction the clutch 412, through lever 532, and its connections is thrown into operation, clutching the gear 414 to the shaft 410 and the tractor belt 81' is driven backward by the engine through beveled gear 74 and its operating means, beveled gear 76, pinion 401, gear 414, clutch 412, shaft 410, beveled gears 416 and 418, shaft 420, pinion 422, and internal gear 424 and drive sprocket 425 of said tractor belt.

When both clutches 406 and 411 are thrown into operation, both traction belts 80' and 81' are driven forward and the tractor truck 3 travels straight ahead. When both clutches 407 and 412 are thrown into operation, both traction belts are driven backward. Either clutch of either unit of the transmission 78 may be thrown into operation while both clutches of the other unit are out of operation, or any two clutches of the two units may be thrown into operation to drive the truck in either direction or to steer the truck in any direction. With the use of the transmission gearing 78 and its controlling means, the truck 3 may be operated synchronously with or independently of the truck 2. In this manner the respective sides of the machine may be moved at the same or at different rates of speed in either forward or backward direction or the tractor trucks swung around 90 degrees and the machine moved sidewise in either direction.

The levers 440 and 441 are connected to the rods 506 and 526 respectively by means of which levers the units 402 and 403 respectively may also be operated. The lever 435 is connected by a rod 535 to one arm of a bell crank lever 536 pivoted on the frame 4, the other arm of which bell crank lever is connected by rod 537 to the operating lever 463 of clutch 53. By means of the lever 435 and its connections, the clutch 53 is thrown into operation to clutch shaft 101 to shaft 52 so that the engine 50 may drive the shafts 101, 113, 121 and 131 through the medium of engine shaft 51, clutch 53, shaft 52, clutch 103, shaft 101, and gears 110, 111, 120 and 130 for the purpose of driving the drums 21, 23, 46 and 48 as will be more fully set forth. By means of the lever 435 through its connections, the clutch 103 may be thrown out of operation to disconnect shaft 101 from shaft 52 so that the shafts 101, 113, 121 and 131 and the gears 21, 23, 46 and 48 will be brought and maintained at rest thus maintaining the hoist drum mechanism out of operation.

The levers 436 and 437 respectively control the hoisting means for the two corners at one side of the frame 1 which rest above the tractor truck 2.

The lever 436 is connected by rod 540 to one arm of a bell crank lever 541, the other end of which bell crank lever is connected by rod 542 to the operating lever 543 of the reverse gearing 104 and to the intermediate arm of a three arm bell crank lever 544 pivoted on the frame 4. The other two arms of said bell crank lever are respectively connected to links 545 and 546 by pins 547 and 548 on said respective arms and slots 549 and 550 in said respective links through which slots said pins project. One end of said links 545 and 546 each, are pivoted together by pivot 551. A wire 552 passes over a sheave 553 mounted on frame 4 and connects the arm of the bell crank lever 544 to which the link 545 is connected to a ring 554, loosely surrounding the cable 20. A wire 555 passes over sheaves 556 mounted on frame 4, and connects the arm of the bell crank lever 544 to which the link 546 is connected, to a ring 557 loosely surrounding the cable 20. A wire 558 connects the pivoted end of the links 545 and 546 to the spring member of a brake 560 on the shaft 107 of drum 21. An engaging element 570 is secured to the cable 20 for engaging the rings 554 and 557. The bell crank lever 544, its operating connections and its operated parts and the engaging element 570 constitute a limiting means 575 for limiting the raising and lowering movement of one corner of the main frame 1 with relation to the tractor truck 2.

While the lever 436 and lever 543 are in neutral position, as shown in Fig. 22, the gearing 104 and the hoist drum 21 remain out of operation and the corner of the frame 1, controlled by cable 20 remains fixed at a given elevation with relation to truck 2. By swinging said lever 436 to one side or the other, the gearing 104 through connections 540 to 543 inclusive, may be thrown into operation to drive one way or the other, and through connections 540 to 542 inclusive, and connections 544 to 558, inclusive, the brake 560 may be released from drum shaft 107 to enable the engine 50, through the medium of clutch 53, shaft 52, clutch 103, shaft 101, reverse gearing 104, shaft 102, worm 105, worm gear 106 and drum 21 to wind the cable 20 upon the drum or to unwind the cable from the drum to raise and lower the corner of the frame controlled by cable 20 with relation to the tractor truck 2. As said corner of the frame is raised to a predetermined height above the tractor truck 2, the element 570 on the cable 20 engages the ring 554 and through wire 522, the bell crank lever 544 is swung back to neutral position whereupon the reverse gearing 104, through rod 542, and the lever 436 through said rod, bell crank lever 541 and rod 540, are thrown into neutral position, disconnecting said gearing and the wire 558 is slackened and the brake 560 brakes the shaft 107 and brings the drum 21 to rest, thus limiting the raising movement of said corner of the frame. As said corner of the frame is lowered to a predetermined distance above the tractor truck 2, the element 70 engages ring 557 and through wire 555 the bell crank lever 544 is swung back to neutral position whereupon the reverse gearing 104 through rod 542 and lever 436, through said rod, bell crank lever 541 and rod 540, are thrown into neutral position, disconnecting said reverse gearing and the wire 558 is slackened and the brake 560 brakes the shaft 107 and brings the drum 21 to rest, thus limiting the lower movement of said corner of the frame.

The lever 437 controls the raising and lowering of the other corner of the side of the frame 1 over the tractor truck 2.

The lever 437 is connected by rod 580 to one arm of a bell crank lever 581, pivoted on frame 4, the other arm of which lever is connected by a rod 582 to the operating lever 583 of reverse gearing 115 and to the intermediate arm of a bell crank 584 of a limiting means 585, similar in construction to the limiting means 575, embracing the cable 22 and having its brake 560 applied to drum shaft 118 and its engaging element 570 secured to said cable. While the lever 437 and lever 583 are in neutral position as shown in the drawing, (Fig. 22) the gearing 115 and hoist drum 23 remain out of operation, and the corner of the frame controlled by cable 22 remains fixed at a given elevation with relation to truck 2. By swinging the lever 437 to one side or the other, the gearing 115, through connections 580 to 583, inclusive, may be thrown into operation to drive one way or the other and through connections 580 to 582 inclusive, and brake connections of limiting means 585, the drum 23 may be released to enable the engine 50 through the medium of clutch 53, shaft 52, clutch 103, shaft 101, gears 110 and 111, shaft 113, shaft 114, gearing 115, worm 116, worm gear 117 and drum 23, to wind the cable 22 upon the drum or to unwind the cable from the drum to raise or lower the corner of the frame, controlled by said cable with relation to the tractor truck 2. The raising and lowering of said corner of the frame is limited by the limiting means 585 in the same manner as the raising and lowering of the other corner of the frame is limited by the limiting means 575.

The lever 438 controls the raising and lowering of the two corners of the frame 1 at the side of the frame resting over the tractor truck 3. The lever 438 is connected by rod 590 to one arm of a bell crank lever 591 pivotally mounted on the frame 25, the other arm of which bell crank lever is connected to operating lever 593 of reverse gearing 124 and to the intermediate arm of a bell crank lever 594 of a limiting means 595, similar in construction to the limiting means 575, embracing the cable 45 and having its brake 560 applied to drum shaft 127 and its engaging element 570 secured to said cable. While the lever 438 and the lever 593 are in neutral position, as shown in Fig. 22, the gearing 124 and hoist drum 46 remain out of operation and both corners of the side of the frame 1 over the tractor truck 3 remain fixed at a given elevation with relation to the tractor truck 3. By swinging the lever 438 to one side or the other, the gearing 124, through connections 590 to 593 inclusive, may be thrown into operation to drive one way or the other and through connections 590 to 592, inclusive, and the limiting means 595, the drum 46 may be released to enable the engine 50 through the medium of clutch 53, shaft 52, clutch 103, shaft 101, gears 110 and 120, shaft section 122, worm 125, worm gear 126, and drum 46, to wind the two cables 45 and 47 upon said drum or to unwind said cables from the drum to raise and lower said corners and side of the frame 1 with relation to tractor truck 3. The raising and lowering of said corners and side of the frame is limited by the limiting means 595 in the same manner as the raising and lowering of the other two corners of the frame are limited by the limiting means 575 and 585.

By means of the hoisting means just described, the main frame 1 may be adjusted to different elevations with relation to the ground and may be brought to a level at different elevations so as the plow carriage moves along the frame the plow will plow the ground level.

The lever 439 controls the operation of the hoist drum 48 and the raising and lowering of the shovel 335. The lever 439 is connected by link 600 to one arm of a bell crank lever 601, the other arm of which bell crank lever is connected by rod 602 to operating lever 603 of reverse gearing 134 and to the intermediate arm of three arm bell crank lever 604 of a limiting means 605, similar in construction to the limiting means 575 embracing cable 347 and having its brake 560 applied to drum shaft 137 and its engaging element 570 secured to said cable. While the levers 439 and 603 are in neutral position as shown in Fig. 22, the gearing 134 and hoist drum 48 remain at rest in the position in which they may be on the track 337, and likewise the shovel 335. By swinging the lever 439 to one side or the other, the gearing 134 through connections 590 to 593 inclusive, may be thrown into operation to drive one way or the other and through connections 590 to 592 inclusive and the brake connections of limiting means 605, the drum 48 may be released to enable the engine 50 through the medium of clutch 53, shaft 52, clutch 103, shaft 101, gears 110, 111 and 130, shaft section 132, gearing 134, shaft section 133, worm 135, worm gear 136, and drum 48 to wind the cable 347 upon or to unwind said cable from said drum to draw the shovel 335 up the track 337 or to lower the shovel down said track. When the shovel is in its lowermost position, as shown in Fig. 7 it rests upon the ground in position to receive the dirt from the scraper 250. When the shovel is drawn to the upper end of the track 337 the forward wheels 339 of the shovel truck engage the stops 350 and as the drum 48 continues to wind up the cable 347 the shovel is swung upon its pivot 341 into a forwardly dumping position, thus dumping the dirt forwardly from the shovel beyond the side of the machine. A cart may be drawn alongside the machine to receive the dirt dumped from the shovel. The lowering of the shovel to its lowermost and dirt receiving position and the raising of the shovel to its uppermost and dumped position are limited by the limiting means 605 in the same manner in which the raising and lowering of the frame 1 is limited by the limiting means 575, 585, 595, and 605.

By means of the lever 450, the plow and scraper carriage 141 may be operated to move from one side to the other of the frame 1. The lever 450 is connected by rod 610 to one arm of lever 611 pivoted on the plow and scraper carriage 141, the other arm of which lever is connected by rod 612 to operating lever 613 of reverse gearing 150, the intermediate arm of three arm bell crank lever 614 of brake means 615 and to one arm of bell crank lever 616, said bell crank levers 614 and 616 being also pivoted on the plow and scraper carriage. The brake 560 of the brake means 615, is applied to carriage shaft 156 and is connected by rod 617 to pivot 618 which pivots one end of links 619, the other end of which links are provided with slots 620 into which extend pins 621 on the other two arms of bell crank lever 614. The other arm of bell crank lever 616 is connected to rod 624 of limiting means 625, said rod being reciprocatively mounted in bearings 626 on the carriage frame. Bumpers 627 and 628 are secured on the respective ends of the frame 1 for engaging the respective ends of the rod 624 when the carriage reaches the end of its travel in either direction on the frame 1. When the lever 450 and its connections are in neutral position, the gearing 150 is inoperative and the plow and scraper carriage remains at rest. By throwing the lever 450 in one direction or the other, the gearing 150 is set to drive one way or the other, the brake 560 is released from the shaft 156 and the limiting means 625 is set, the rod 624 being projected beyond one or the other bearings 626, whereupon the plow and scraper carriage 141 is driven by the engine 145 from one side of the frame 1 to the other, through the medium of shaft 146, gearing 150, shaft 147, gears 151 and 152, shaft 153, gears 154 and 155, shaft 156, pinion 157 and rack 158. As the carriage approaches one side or the other of the frame, an end of the rod 624 engages one of the bumpers 627 and 628 and the limiting means 625 through its connections, restores the gearing 150, brake mechanism 615 and operating lever 450 to neutral position whereupon the gearing 150 is thrown out of operation and the brake is applied to shaft 156, stopping the carriage at one side of the frame 1. As the carriage 141 is driven from one side of the frame 1 to the other, the plow 166, assuming the plow to be lowered the proper depth, cuts the earth the depth of the plow and pulverizes the cut earth, the blades 167 cutting vertical cuts in the earth and the blades 170, cutting the earth flat below the surface, said blades 170 dipping forwardly on their pivots 180 and their dipping position being determined by the engagement of one of their surfaces 183 or 184 with shoulder 181 or 182 of blades 167, so as to direct the earth upwardly in a rearward direction whereby the earth is pulverized. When the frame 1 is adjusted to a level position, the plow blades 170 cut the earth off level leaving the ground with a level surface when the earth is removed.

The lever 451 controls the raising and lowering of the plow 166. Said lever is connected by rod 630 to the operating lever 631 of reverse gearing 217, bell crank lever 632 of brake mechanism 635, mounted on the carriage 141 and bell crank lever 636 of limiting mechanism 640. The brake mechanism 635 is similar in construction to the brake mechanism 615 and its brake 560 is applied to shaft 213. The limiting means 640 includes a rod 641, mounted in bearings 642 on the carriage 141 and connected to the bell crank lever 636 also mounted on the carriage, and bumpers 643 and 644 on one of the slides 163. When the lever 451 is in neutral position, the gearing 278 and limiting means are in neutral position and the brake in braking position on the shaft 213 and the plow remains in the position in which it is located. When the lever 451 is swung in one direction or the other, the gearing 278 is set to drive in one direction or the other, the brake 560 is released from the shaft 213 and the limiting means is set so that one end or the other of rod 641 will engage one of the bumpers 643 or 644 whereupon the engine 145 raises or lowers the plow 166, through the medium of shaft 146, gears 224, 223, 221, and 220, gearing 217, shaft 216, gears 215, and 214, shaft 213, pinions 212, and 211 and racks 210 and the guides 189 and 190 are raised and lowered by the slides 162 through the operation of latch 225.

The lever 452 controls the movement of the scraper carriage 240 and scraper 250 transversely of the plow and scraper carriage 141. Said lever is connected by rod 650, the one arm of bell crank lever 651 pivoted on the plow and scraper carriage 141, the other arm of which lever is connected by rod 652 to an arm 653 on a rock shaft 654 mounted in bearings 655 on the side frame members 161 of the plow and scraper carriage above the scraper carriage. An arm 656 is slidably keyed on the shaft 654, which arm is connected by link 657 to one arm of a bell crank lever 658 pivoted on the frame 245 of the scraper carriage. The other arm of said bell crank lever 658 is connected to rod 659 of a limiting means 660, said rod being reciprocatively mounted, in bearings 661 on the scraper carriage frame 245. The limiting means includes in addition to said rod, a pair of bumpers 662 and 663 secured on the respective sides of the plow and scraper carriage frame 141'. The rod 659 is connected to operating lever 664 of reverse gearing 278 and to the three arm bell crank lever of brake mechanism 665, the brake 560 of which is applied to shaft 298. When the lever 452, gearing 278, and brake mechanism 665 are in neutral position, the gearing 278 remains idle and the brake 560 brakes the shaft 298 and the scraper carriage 240 remains at rest. When the lever 452 is shifted to one side or the other, the gearing 278 is set to drive one way or the other, the brake 560 of brake mechanism 665 releases the shaft 298 and the limiting means is set to limit the transverse movement of the scraper carriage on the plow and scraper carriage whereupon the engine 145 drives the scraper carriage across the plow and the scraper carriage in one direction or the other, through the medium of shaft 146, gears 224 and 223, shaft 222, beveled gears 290 and 289, shaft 287, beveled gears 286 and 285, shaft 270, gears 273 and 277, gearing 278, shaft 295, beveled pinion and gear 296 and 297, shaft 298, pinions 300 and rack 301. As the scraper carriage reaches the limit of its movement in either direction, across the plow and scraper carriage, one end of the rod 659 engages bumper 662 or 663, whereupon the limiting mechanism 660, gearing 278, brake mechanism and operating lever 452 are brought back to neutral position and the brake of the brake mechanism brakes the shaft 298 and brings the scraper carriage to rest at the limit of its movement at one side or the other of plow and scraper carriage 141.

The lever 453 controls the rotation of the scraper 250. Said lever is connected by rod 670 to one arm of bell crank lever 671 pivoted on the plow and scraper carriage 141, the other arm of which bell crank lever is connected by rod 672 to arm 673 on one end of rock shaft 674 mounted in bearings 675 on the plow and scraper carriage side frame members 161 above the scraper carriage 240. An arm 676 is slidably keyed on the rock shaft 674 and is connected by link 677 to one arm of bell crank lever 678 pivoted on the scraper carriage 240, the other arm of which lever is connected to a rod 679. The rod 679 is connected also to operating arm 680 of the reverse gearing 279 and to the three arm bell crank lever of brake means 685, the brake 560 of said means being applied to shaft 318. When the lever 453 is in neutral position, the gearing 279 remains idle and the brake 560 of brake means 685 brakes the shaft 318 and the scraper 250 remains stationary against rotation. When the lever 453 is shifted in one direction or the other, the gearing 279 is set to drive one way or the other and the brake of brake means is released from the shaft 318, whereupon the engine 145 rotates the scraper 250 through the medium of shaft 270 and its operating means, gears 272 and 276, gearing 279, shaft 315, beveled pinion and gear 316 and 317, shaft 318, beveled pinion 320, beveled gears 321 and 322, shafts 324 and 325, pinions 328 and 329 and gear 330.

The lever 454 controls the raising and lowering movement of the scraper 250. The lever 454 is connected by rod 690 to one arm of bell crank lever 671 pivoted on the plow and scraper carriage, the other arm of which lever is connected by rod 692 to arm 693 on one end of a rock shaft 694 mounted in bearings 695 on the side frame members 161 of the plow and scraper carriage and extending transversely over the scraper carriage. An arm 696 is slidably keyed on the shaft 694 and is connected by link 697 to one arm of a bell crank lever 698 pivoted on the scraper carriage 240, the other arm of which bell crank lever is connected to a rod 699. The rod 699 is connected to operating lever 700 of reverse gearing 281 and to one arm of bell crank lever 701 pivoted on the scraper carriage 240, the other arm of which lever is connected to rod 702 of a limiting means 705, said rod being reciprocatively mounted in bearings 706 on the scraper carriage. The limiting means 705 includes two bumpers 707 and 708 secured on one of the racks 249. The rod 702 is connected to the intermediate arm of the three arm bell crank lever of the brake mechanism including a brake 560 applied to shaft 308. When the lever 454 is swung in one direction or the other, the gearing 281 through its operating connections is set to drive in one direction or the other, the limiting means 705, through its operating connections, is set to limit the raising and lowering movement of the scraper and the brake 560, of brake mechanism 710, through its operating connections is released from the shaft 308, whereupon the scraper 250 is raised or lowered by the engine 145 through the medium of shaft 270 and its operating means, gears 272, 276 and 280, reverse gearing 281, shaft 305, gears 306 and 307, shaft 308, worms 309, worm gears 310, shafts 248, pinions 247 and racks 249. As the scraper reaches the limit of its raising and lowering movement, the projecting end of rod 702 engages bumper 707 or 708 and restores the gearing 281, braking means 710, limiting means 705 and lever 454 to neutral position, whereupon the gearing 281 is thrown out of connection and the brake 560 of brake means 710, brakes the shaft 308, thus limiting the raising and lowering movement of the scraper and bringing the scraper to rest in its uppermost or lowermost position.

The arms 656, 676, and 696, are respectively slidably keyed on the shafts 654, 674 and 694, so that said arms may slide along said shafts and permit transverse movement of the scraper carriage on the plow without affecting the scraper operating mechanism.

When the plow has performed its plowing operation, it may be elevated above the ground and the scraper driven in the frame by the carriage 141 to the shovel 335 in its lowermost position to scrape the plowed earth into the shovel, the scraper being also moved to one side or the other by the carriage 240 and raised and lowered and rotated as conditions require to enable it to scrape the dirt into the shovel. When the shovel is full of dirt, it is raised and the dirt dumped therefrom, and let down again to receive more dirt and so on until the excavation of the ground is complete.

In irrigation excavation, the machine is operated to level off the ground to form irrigation tracts and the scraper operated to scrape the dirt into checks at the side of the level irrigation tract.

The machine may be used for a great variety of excavating work.

Having described my invention, I claim as new and desire to secure by Letters Patent:

1. In an excavating machine, a running gear; a prime mover for operating said running gear; a main frame mounted on said running gear; a plow operatively mounted on said frame; a scraper mounted to turn and move vertically on said frame; an independent prime mover for operating said plow and scraper and a shovel at one end of said frame to receive and deliver the dirt scraped up by said scraper.

2. In an excavating machine, a running gear, a main frame mounted on said running gear, a scraper operatively mounted on said frame, a shovel operatively mounted on said frame to receive and deliver the dirt scraped up by said scraper and a prime mover for operating said running gear, scraper and shovel.

3. In an excavating machine a main frame; running gear mounted on the opposite ends of said frame; means on one of said running gears for operating said other running gear; a carriage reciprocatingly mounted on said frame; a plow on said carriage; a scraper on said carriage and an independent prime mover on said carriage for driving said carriage and operating said plow and scraper.

4. In an excavating machine, a pair of tractor trucks; a main frame pivotally mounted at each side on one of said trucks; means mounted on one of said trucks for operating both of said trucks; means for steering said trucks and a plow with an independent prime mover operatively mounted on said frame.

5. In an excavating machine a pair of tractor trucks; a main frame pivotally mounted at each side on one of said trucks; a carriage, with an independent prime mover thereon, operatively mounted on said frame; a plow operatively mounted on said carriage; a scraper operatively mounted on said carriage and a shovel operatively mounted on said frame to receive and deliver the dirt scraped up by said scraper.

6. In an excavating machine a pair of tractor trucks; a main frame mounted at each side on one of said trucks; a movable carriage, with an independent prime mover thereon operatively mounted on said frame; a plow operatively mounted on said carriage, a scraper operatively mounted upon said carriage and movable from side to side, and a shovel operatively mounted on one side of said frame to receive and deliver the dirt scraped up by said scraper.

7. In an excavating machine, a pair of tractor trucks; a main frame pivotally mounted at each side on one of said trucks; means mounted on the frame for operating said trucks; a carriage mounted on said frame to travel from side to side of the frame with an independent prime moving means thereon; a plow operatively mounted on said carriage and a scraper operatively mounted on said carriage to move vertically and laterally and to turn on said frame.

8. In an excavating machine, a pair of tractor trucks; a main frame pivotally mounted at each side on one of said trucks; means mounted on one of said trucks for operating both of said trucks; a carriage mounted on said frame to travel from side to side of the frame with an independent prime moving means thereon; a plow operatively mounted on said carriage and a scraper operatively mounted on said carriage to move vertically and laterally with relation to said frame.

9. In an excavating machine, a running gear having a prime mover thereon; a main frame operatively mounted on said running gear; a carriage mounted on said frame to travel from side to side thereof; a plow operatively mounted on said carriage; means for vertically adjusting said plow relative to the carriage and a scraper operatively mounted on said carriage to move vertically and laterally and to revolve about a vertical axis on said carriage and a prime mover on said carriage for operating said plow and scraper.

10. In an excavating machine, a running gear, a main frame operatively mounted on said running gear, a carriage operatively mounted on said frame, a prime mover for operating said carriage, a plow operatively mounted on said carriage to move vertically with relation to said carriage and a scraper operatively mounted on said carriage to move vertically and laterally with relation to said carriage independently of said plow.

11. In an excavating machine, a running gear, a main frame operatively mounted on said running gear, a carriage operatively mounted on said frame, a plow operatively mounted on said carriage to move vertically with relation thereto, and a scraper operatively mounted on said carriage to move vertically, laterally and be revolved on a vertical axis with relation thereto independently of said plow.

12. In an excavating machine, a running gear, a main frame operatively mounted on said running gear, a carriage operatively mounted on said frame, a plow operatively mounted on said carriage to move vertically with relation thereto, and a scraper mounted on said carriage to turn on a vertical axis with relation thereto independently of said plow.

13. In an excavating machine, a main frame, two trucks on which the two sides of the frame are mounted, one side of said frame being pivoted to swing vertically upon one of said trucks, means for raising and lowering said side of the frame with relation to said truck, means for raising and lowering the two corners at the other side of the frame independently with relation to the other truck, and a plow reciprocatively mounted on said frame.

14. In an excavating machine, a pair of tractor trucks; a main frame pivotally mounted at each side on one of said trucks; means mounted on said frame for operating both of said trucks; a plow on said frame; an independent prime moving means for adjusting and operating said plow, whereby said plow may be caused to plow off the ground level or at an incline.

15. In an excavating machine, a pair of tractor trucks; a main frame pivotally mounted at each side on one of said trucks; means mounted on said frame for operating said trucks; a plow mounted on said frame for plowing the ground and means for scraping up the plowed ground in the form of checks and levees.

16. In an excavating machine, a pair of tractor trucks; a main frame pivotally mounted at each side on one of said trucks; means mounted on one of said trucks for operating both of said trucks; a plow mounted on said frame to travel from side to side of said frame; independent means for operating said plow, said plow including a plurality of horizontal blades.

17. In an excavating machine, a running gear; a main frame operatively mounted on said running gear; a plow mounted on said frame, said plow including a plurality of vertical blades with duplicate edges and a plurality of horizontal blades with duplicate edges pivotally connected to the ends of said vertical blades.

18. In an excavating machine, a running gear; a main frame operatively mounted on said running gear; a plow mounted on said frame; said plow including a plurality of pivotally mounted, horizontal, symmetrical blades for dipping forwardly or rearwardly as the plow moves forwardly or rearwardly.

19. In an excavating machine, a pair of tractor trucks; a main frame pivotally mounted at each side on one of said trucks; means mounted on said frame for operating said trucks; a plow including a plurality of vertical blades with duplicate cutting edges and a plurality of horizontal, symmetrical blades mounted to dip forwardly or rearwardly as the plow moves forwardly or rearwardly.

20. In an excavating machine, a running gear, a frame mounted on said running gear, a plow mounted on said frame, said plow including a plurality of horizontal blades formed with double edges and mounted to dip forwardly so that one edge of said blades will cut as the plow is moved forwardly in either direction.

21. In an excavating machine, a pair of tractor trucks; a main frame pivotally mounted at each side on one of said trucks; means mounted on one of said trucks for operating both of said trucks; a plow mounted on said frame, said plow including a plurality of horizontal symmetrical blades formed with double edges and mounted to dip forwardly so that one edge of said blades will cut as the plow is moved forwardly in either direction and means for limiting the dipping movement of said horizontal blade.

22. In an excavating machine, a running gear, a prime mover for operating said running gear, a frame operatively mounted on said running gear, a plow operatively mounted on said frame to move from side to side of the frame with an independent prime moving means thereon, said plow including two series of standards, one series being mounted forwardly of and staggered with relation to the other series of standards, and a horizontal blade mounted on each of said standards, said standards having two cutting edges so as to be operable in the forward or reverse direction without removal from the ground.

23. In an excavating machine, a running gear; a prime mover for operating said running gear, a frame operatively mounted on said running gear, a plow operatively mounted on said frame to move from side to side of the frame with an independent prime moving means thereon, said plow including two series of vertical blades, one series being mounted forwardly of and staggered with relation to the other series of blades, and horizontal blades mounted on the vertical blades, said blades having two cutting edges so as to be operable in the forward or reverse direction without removal from the ground.

24. In an excavating machine, a running gear, a prime mover for operating said running gear, a frame operatively mounted on said running gear, a plow operatively mounted on said frame to move from side to side of the frame with an independent prime moving means thereon, said plow including two series of vertical blades, one series being mounted forwardly of the other series and staggered with relation thereto, and horizontal blades pivotally mounted on said vertical blades to dip forwardly, said blades having two cutting edges so as to be operable in the forward or reverse direction without removal from the ground.

25. In an excavating machine, a pair of tractor trucks; a main frame pivotally mounted at each side on one of said trucks; means mounted on said frame for operating said trucks; a plow mounted on said frame to travel from side to side of the frame with an independent prime moving means thereon, said plow including a standard and a horizontal blade mounted on said standard and formed with a receding cutting edge.

26. In an excavating machine, a pair of tractor trucks; a main frame pivotally mounted at each side on one of said trucks; means mounted on one of said trucks for operating both of said trucks; a plow mounted on said frame to travel from side to side of the frame with an independent prime moving means thereon, said plow including a vertical blade and a horizontal blade mounted on said vertical blade and formed with a receding cutting edge receding rearwardly in both directions from said vertical blade.

27. In an excavating machine, a pair of tractor trucks; a main frame pivotally mounted at each side on one of said trucks; means mounted on said frame for operating said trucks; a plow mounted to travel on said frame with an independent prime moving means thereon, said plow including a vertical blade and a horizontal blade, formed with a receding cutting edge, mounted on said vertical blade to dip forwardly and means for limiting the dipping movement of said horizontal blade.

28. In an excavating machine, a pair of tractor trucks; a main frame pivotally mounted at each side on one of said trucks; means mounted on said frame for operating said trucks; a plow mounted to travel on said frame with an independent prime moving means thereon; said plow including two series of vertical blades, one series being mounted forwardly of and staggered with relation to the other series and horizontal blades pivotally mounted on said vertical blades to dip forwardly and formed with receding cutting edges.

29. In an excavating machine, a running gear, a frame mounted on said running gear, a plow mounted on said frame to move horizontally and vertically thereon; said plow including a plurality of vertical standards and a plurality of horizontal blades mounted on said standards and means for reinforcing said standards when the plow is lowered.

30. In an excavating machine, a pair of tractor trucks; a main frame pivotally mounted at each side on one of said trucks; means mounted on said frame for operating said trucks; a carriage mounted on said frame to travel from side to side of the frame with an independent prime moving means thereon; a plow mounted on said carriage, said plow including a vertical blade and a horizontal blade mounted on said vertical blade and formed with a receding cutting edge receding rearwardly in both directions from said vertical blade and a scraper operatively mounted on said carriage to move vertically and laterally and to turn on said frame.

31. In an excavating machine a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground and a scraper on said carriage.

32. In an excavating machine, a main frame; running gears mounted on opposite ends of said main frame; means on one of said running gears for operating said other running gear; a main carriage reciprocatively mounted on said frame; plows mounted on said carriage; means for vertically adjusting the height of said plows; a second carriage mounted in said main carriage; means for moving said second mentioned carriage transversely to the direction of movement of said main carriage and a scraper mounted on said second mentioned carriage.

33. In an excavating machine a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage and means for vertically adjusting the height of said scraper relative to the ground.

34. In an excavating machine, a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage; spaced supports on the carriage for vertically adjusting the height of said scraper relative to the ground and means whereby the supports on one side of the scraper can be raised or lowered independently of the other set of supports.

35. In an excavating machine, a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage and means for revolving said scraper around a vertical axis.

36. In an excavating machine, a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage; means for vertically adjusting the height of said scraper relative to the ground and means for revolving said scraper around a vertical axis.

37. In an excavating machine, a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage; spaced supports on the carriage for vertically adjusting the height of said scraper relative to the ground; means whereby the supports on one side of the scraper can be raised or lowered independently of the other set of supports and means for revolving said scraper around a vertical axis.

38. In an excavating machine, a main frame; running gears mounted on opposite ends of said main frame; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground; a scraper on said carriage and means whereby said plow can be operated independently of said scraper and vice versa.

39. In an excavating machine, a main frame; running gears mounted on opposite ends of said main frame; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage; a scraper mounted on said second mentioned carriage and means for revolving said scraper about a vertical axis.

40. In an excavating machine, a main frame; running gears mounted on opposite ends of said main frame; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage; a scraper mounted on said second mentioned carriage; means for revolving said scraper about a vertical axis and means whereby said plow can be operated independently of said scraper and vice versa.

41. In an excavating machine, a main frame; running gears mounted on opposite ends of said main frame; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage; a scraper mounted on said second mentioned carriage; spaced supports on the second mentioned carriage for vertically adjusting the height of said scraper relative to the ground and means whereby the supports on one side of the scraper can be raised or lowered independently of the other set of supports.

42. In an excavating machine, a main frame; running gears mounted on opposite ends of said main frame; means on one of said running gears for operating said other running gear; a main carriage reciprocatively mounted on said frame; plows mounted on said carriage; means for vertically adjusting the height of said plows; means for moving said carriage independently of said running gear; a second carriage mounted on said main carriage; means for moving said second carriage transversely to the direction of movement of said main carriage; a scraper on said second carriage; means for revolving said scraper about a vertical axis; means for vertically adjusting the height of said scraper relative to the ground and means whereby said scraper can be operated independently of said plow and vice versa.

43. In an excavating machine a pair of tractor trucks; a main frame; means for revolubly connecting each of the ends of said main frame to one of said tractor trucks; means mounted on the frame for operating each of said trucks; a carriage reciprocatively mounted on the main frame; plows operatively mounted on said carriage and a scraper operatively mounted on said carriage to move vertically and laterally.

44. In an excavating machine a pair of tractor trucks; a main frame; means for revolubly connecting each of the ends of said main frame to one of said tractor trucks; a yoke for holding one end of said frame rigidly to the revoluble element on one of said trucks; means for pivotally connecting the other end of said frame to the revoluble element on the remaining tractor truck; means mounted on the frame for operating each of said trucks; a carriage reciprocatively mounted on the main frame; plows operatively mounted on said carriage and a scraper operatively mounted on said carriage to move vertically and laterally.

45. In an excavating machine a pair of tractor trucks, a main frame; means for removably connecting each of the ends of said main frame to one of said tractor trucks; means mounted on the frame for operating each of said trucks; a carriage reciprocatively mounted on the main frame; plows operatively mounted on said carriage; a scraper operatively mounted on said carriage to move vertically and laterally and a shovel operatively mounted on one end of said frame and to receive and deliver the dirt scraped up by said scraper.

46. In an excavating machine a pair of tractor trucks; a main frame; means for revolubly connecting each of the ends of said main frame to one of said tractor trucks; a yoke for holding one end of said frame rigidly to the revoluble element on one of said trucks; means for pivotally connecting the other end of said frame to the revoluble element on the remaining tractor truck; means mounted on the frame for operating each of said trucks; a carriage reciprocatively mounted on the main frame; plows operatively mounted on said carriage; a scraper operatively mounted on said carriage to move vertically and laterally and a shovel operatively mounted on one end of said frame to receive and deliver the dirt scraped up by said scraper.

47. In an excavating machine, a main frame; running gears mounted on opposite ends of said main frame; means for vertically adjusting said main frame on said running gear; means on one of said running gears for operating said other running gear, a carriage reciprocatively mounted on said frame; an independent prime mover mounted on said carriage for moving said carriage on said main frame; a plow mounted on said carriage; means for vertically adjusting the height of said plow relative to the ground and a scraper on said carriage.

48. In an excavating machine, a main frame; running gears mounted on opposite ends of said main frame; means for vertically adjusting one end of said frame independently of the other end and vice versa; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground and a scraper on said carriage.

49. In an excavating machine, a main frame; running gears mounted on opposite ends of said main frame; means for vertically adjusting said main frame on said running gear; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage and a scraper mounted on said second mentioned carriage.

50. In an excavating machine a main frame; running gears mounted on opposite ends of said main frame; means for vertically adjusting one end of said frame independently of the other end and vice versa; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage and a scraper mounted on said second mentioned carriage.

51. In an excavating machine a pair of tractor trucks, a main frame; means for revolubly connecting each of the ends of said main frame to one of the tractor trucks; a yoke for holding one end of said frame rigidly to the revoluble element on one of said trucks; means for pivotally connecting the other end of said frame to the revoluble element on the remaining tractor truck; means on one of said trucks for operating said other truck; a carriage reciprocatively mounted on said frame; an independent prime mover mounted on said carriage for moving said carriage on said main frame; a plow mounted on said carriage; means for vertically adjusting the height of said plow relative to the ground and a scraper on said carriage.

52. In an excavating machine a pair of tractor trucks; a main frame; means for revolubly connecting each of the ends of said main frame to one of the tractor trucks; a yoke for holding one end of said frame rigidly to the revoluble element on one of said trucks; means for pivotally connecting the other end of said frame to the revoluble element on the remaining tractor truck; means on one of said trucks for operating said other truck; a carriage reciprocatively mounted on said frame; plows mounted on said carriage; means for vertically adjusting the height of said plows; a second carriage mounted in said main carriage; means for moving said second mentioned carriage transversely to the direction of movement of said main carriage and a scraper mounted on said second mentioned carriage.

53. In an excavating machine, a main frame; running gears mounted on opposite ends of said main frame; means for vertically adjusting said main frame on said running gears; a main carriage reciprocatively mounted on said frame; plows mounted on said carriage; means for vertically adjusting the height of said plows; means for moving said carriage independently of said running gears; a second carriage mounted on said main carriage; means for moving said second carriage transversely to the direction of movement of said main carriage; a scraper on said second carriage; means for revolving said scraper about a vertical axis; means for vertically adjusting the height of said scraper relative to the ground and means whereby said scraper can be operated independently of said plow and vice versa.

54. In an excavating machine, a main frame; running gears mounted on opposite ends of said main frame; means for revolubly connecting each of the ends of said main frame to said running gears; a yoke for holding one end of said frame rigidly to the revoluble element on one of said running gears; means for pivotally connecting the other end of said frame to the revoluble element on the remaining running gear; means on one of said running gears for operating said other running gear; a main carriage reciprocatively mounted on said frame; plows mounted on said carriage; means for vertically adjusting the height of said plows; means for moving said carriage independently of said running gears; a second carriage mounted on said main carriage; means for moving said second carriage transversely to the direction of movement of said main carriage; a scraper on said second carriage; means for revolving said scraper about a vertical axis; means for vertically adjusting the height of said scraper relative to the ground and means whereby said scraper can be operated independently of said plow and vice versa.

55. In an excavating machine, a main frame; running gears mounted on opposite ends of said main frame; means for revolubly connecting each of the ends of said main frame to said running gear; a yoke for holding one end of said frame rigidly to the revoluble element on one of said running gears; means for pivotally connecting the other end of said frame to the revoluble element on the remaining running gear; means on one of said running gears for operating said other running gear; a main carriage reciprocatively mounted on said frame; plows mounted on said carriage; means for vertically adjusting the height of said plows; means for moving said carriage independently of said running gears; a second carriage mounted on said main carriage; means for moving said second carriage transversely to the direction of movement of said main carriage; a scraper on said second carriage; means for revolving said scraper about a vertical axis; means for vertically adjusting the height of said scraper relative to the ground; means whereby said scraper can be operated independently of said plow and vice versa and a shovel operatively mounted on one end of said frame to receive and deliver the dirt scraped up by said scraper.

56. In an excavating machine, a main frame; running gears mounted on opposite ends of said main frame; means for vertically adjusting said main frame on said running gears; means for revolubly connecting each of the ends of said main frame to said running gears; a yoke for holding one end of said frame rigidly to the revoluble element on one of said running gears; means for pivotally connecting the other end of said frame to the revoluble element on the remaining running gear; means on one of said running gears for operating said other running gear; a main carriage reciprocatively mounted on said frame; plows mounted on said carriage; means for vertically adjusting the height of said plows; means for moving said carriage independently of said running gear; a second carriage mounted on said main carriage; means for moving said second carriage transversely to the direction of movement of said carriage; a scraper on said second carriage; means for revolving said scraper about a vertical axis; means for vertically adjusting the height of said scraper relative to the ground and means whereby said scraper can be operated independently of said plow and vice versa.

57. In an excavating machine, a main frame; running gears mounted on opposite ends of said main frame; means for vertically adjusting one end of said frame relative to the ground independently of the other end and vice versa; means for revolubly connecting each of the ends of said main frame to said running gears; a yoke for holding one end of said frame rigidly to the revoluble element on one of said running gears; means for pivotally connecting the other end of said frame to the revoluble element on the remaining running gear; means on one of said running gears for operating said other running gear; a main carriage reciprocatively mounted on said frame; plows mounted on said carriage; means for vertically adjusting the height of said plows; means for moving said carriage independently of said running gears; a second carriage mounted on said main carriage; means for moving said second carriage transversely to the direction of movement of said main carriage; a scraper on said second carriage; means for revolving said scraper about a vertical axis; means for vertically adjusting the height of said scraper relative to the ground and means whereby said scraper can be operated independently of said plow and vice versa.

58. In an excavating machine, a main frame; running gears mounted on opposite ends of said main frame; means for vertically adjusting said main frame on said running gears; means for revolubly connecting each of the ends of said main frame to said running gear; a yoke for holding one end of said frame rigidly to the revoluble element on one of said running gears; means for pivotally connecting the other end of said frame to the revoluble element on the remaining running gear; means on one of said running gears for operating said other running gear; a carriage reciprocatively mounted on said frame; an independent prime mover mounted on said carriage for moving said carriage on said main frame; a plow mounted on said carriage; means for vertically adjusting the height of said plow relative to the ground and a scraper on said carriage.

59. In an excavating machine, a main frame; running gears mounted on opposite ends of said main frame; means for vertically adjusting one end of said frame independently of the other end and vice versa; means for revolubly connecting each of the ends of said main frame to said running gear; a yoke for holding one end of said frame rigidly to the revoluble element on one of said running gears; means for pivotally connecting the other end of said frame to the revoluble element on the remaining running gear; means on one of said running gears for operating said other running gear; a main carriage reciprocatively mounted on said frame; plows mounted on said carriage; means for vertically adjusting the height of said plows; a second carriage mounted on said main carriage; means for moving said second mentioned carriage transversely to the direction of movement of said main carriage and a scraper mounted on said second mentioned carriage.

60. In an excavating machine a running gear; a main frame mounted on said running gear; a carriage reciprocatively mounted on said frame; an independent prime mover for driving said carriage; a plow operatively mounted on said carriage; a scraper operatively mounted on said carriage; a shovel at one end of said frame to receive the dirt scraped up by said scraper; parallel guides on opposite sides of the frame; rollers on said shovel slidably mounted on said parallel guides and means for moving said shovel in said guides.

61. In an excavating machine, a running gear, a main frame adjustably mounted on said running gear; a prime mover on said running gear; a main carriage reciprocatively mounted on said main frame; a plow operatively mounted on said carriage, a scraper operatively mounted on said carriage, and a shovel operatively mounted at one end of said main frame, and means for operating said main carriage independenly of said running gear.

62. In an excavating machine, a pair of tractor trucks, a main frame pivotally mounted at each side on one of said trucks and adjustable vertically at either end, a prime mover for operating said tractor trucks; a scraper operatively mounted on said frame and a shovel operatively mounted on said frame and means connecting said scraper and shovel with said prime mover.

63. In an excavating machine, a main frame mounted on supporting trucks, a carriage operatively mounted on said main frame, a plow operatively mounted on said carriage, a scraper operatively mounted on said carriage, a shovel operatively mounted on said main frame to receive and deliver soil loosened by said plow and scraped into it by said scraper, and means for operating said shovel and said main carriage independently of said truck.

In testimony whereof, I have hereunto set my hand at San Francisco, California, this 28th day of November, 1917.

ADOLPH H. WELLENSIEK.

In presence of—
BALDWIN VALE,
A. J. HENRY.